United States Patent
Roy

(10) Patent No.: US 11,544,570 B2
(45) Date of Patent: Jan. 3, 2023

(54) METHOD AND APPARATUS FOR LARGE SCALE MACHINE LEARNING

(71) Applicant: Arizona Board of Regents on behalf of Arizona State University, Scottsdale, AZ (US)

(72) Inventor: Asim Roy, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 1279 days.

(21) Appl. No.: 15/735,573

(22) PCT Filed: Jun. 10, 2016

(86) PCT No.: PCT/US2016/037079
§ 371 (c)(1),
(2) Date: Dec. 11, 2017

(87) PCT Pub. No.: WO2017/003666
PCT Pub. Date: Jan. 5, 2017

(65) Prior Publication Data
US 2018/0300631 A1    Oct. 18, 2018

Related U.S. Application Data

(60) Provisional application No. 62/186,891, filed on Jun. 30, 2015.

(51) Int. Cl.
*G06N 3/08* (2006.01)
*G06N 3/04* (2006.01)

(52) U.S. Cl.
CPC .......... *G06N 3/088* (2013.01); *G06N 3/0454* (2013.01)

(58) Field of Classification Search
CPC .............................. G06N 3/0454; G06N 3/088
See application file for complete search history.

(56) References Cited

U.S. PATENT DOCUMENTS

| 5,299,284 A | 3/1994 | Roy |
| 9,053,431 B1 | 6/2015 | Commons |

(Continued)

FOREIGN PATENT DOCUMENTS

| EP | 2639749 A1 | 9/2013 |
| WO | 2017003666 A1 | 1/2017 |

OTHER PUBLICATIONS

Westerlund et al., Classification with Kohonen Self-Organizing Maps, Soft Computing Apr. 2005. (Year: 2005).*

(Continued)

*Primary Examiner* — Kamran Afshar
*Assistant Examiner* — Marshall L Werner
(74) *Attorney, Agent, or Firm* — Elliott, Ostrander & Preston, P.C.

(57) ABSTRACT

Analyzing patterns in a volume of data and taking an action based on the analysis involves receiving data and training the data to create training examples, and then selecting features that are predictive of different classes of patterns in the data stream, using the training examples. The process further involves training in parallel a set of artificial neural networks ("ANNs"), using the data, based on the selected features, and extracting only active nodes that are representative of a class of patterns in the data stream from the set of ANNs. The process continues with adding class labels to each extracted active node, classifying patterns in the data based on the class-labeled active nodes, and taking an action based on the classifying patterns in the data.

16 Claims, 6 Drawing Sheets

(56) References Cited

U.S. PATENT DOCUMENTS

| | | |
|---|---|---|
| 2011/0178967 A1 | 7/2011 | Delp |
| 2013/0138587 A1 | 5/2013 | Patil et al. |
| 2013/0147598 A1 | 6/2013 | Hoffberg et al. |

OTHER PUBLICATIONS

Almendra et al., Using Self-Organizing Maps for Binary Classification with Highly Imbalanced Datasets, International Journal of Numerical Analysis and Modeling Series B, vol. 5, No. 3, pp. 238-254, 2014. (Year: 2014).*

Simon et al., A Combined Application of Two Different Neural Network Types for the Prediction of Chemical Reactivity, J. Am. Chem. Soc. 1993, vol. 115, Is. 20, pp. 9148-9159, Oct. 1993. (Year: 1993).*

Myklebust et al., Parallel Self-Organizing Maps for Actual Applications, Proceedings of ICNN'95—International Conference on Neural Networks, Nov. 1995. (Year: 1995).*

Roy et al., Methods for Pattern Selection, Class-Specific Feature Selection and Classification for Automated Learning, Neural Networks, vol. 41, pp. 113-129, May 2013. (Year: 2013).*

Batista, G. et al., "A study of the behavior of several methods for balancing machine learning training data", ACM SIGKDD Explorations Newsletter—Special Issue on Learning from Imbalanced Datasets, Jun. 2004, vol. 6, No. 1, pp. 20-29 <DOI:10.1145/1007730.1007735>.

Bernard, S. et al., "Fingerprint classification using Kohonen topologic map", Proceedings of the International Conference on Image Processing (Thessaloniki, Greece, Oct. 7-10, 2001), 2001 (date added to IEEE Xplore: Aug. 2002), pp. 230-233 <DOI:10.1109/ICIP.2001.958093>.

Bifet, A. et al., "Efficient data stream classification via probabilistic adaptive windows", Proceedings of the 28th ACM Symposium on Applied Computing (Coimbra, Portugal, Mar. 18-22, 2013), 2013, 6 pages <DOI:10.1145/2480362.2480516>.

Breiman, L., "Random forests", Machine Learning, Oct. 2001, vol. 45, No. 1, pp. 5-32 <DOI:10.1023/A:1010933404324>.

Chawla, N. et al., "SMOTE: Synthetic Minority Oversampling Technique", Journal of Artificial Intelligence Research, Jun. 2002, vol. 16, pp. 321-357 <DOI:10.1613/jair.953>.

Chomboon, K. et al., "Rare Class Discovery Techniques for Highly Imbalanced Data", Proceedings of the International MultiConference of Engineers and Computer Scientists (Hong Kong, Mar. 13-15, 2013), 2013, 4 pages.

Drummond, C. et al., "C4.5, Class Imbalance, and Cost Sensitivity: Why Under-Sampling beats Over-Sampling", Proceedings of the International Conference on Machine Learning: Workshop on Learning from Imbalanced Data Sets II (Washington, DC, Jul. 2003), 2003, 8 pages.

Estabrooks, A. et al., "A Multiple Resampling Method for Learning from Imbalanced Data Sets", Computational Intelligence, Feb. 2004 (available online Jan. 2004), vol. 20, No. 1, pp. 18-36 <DOI:10.1111/j.0824-7935.2004.t01-1-00228.x>.

Gaber, M. et al., "A survey of classification methods in data streams", Data Streams: In Advances in Database Systems, 2007, vol. 31, pp. 39-59 <DOI:10.1007/978-0-387-47534-9_3>.

Galar, M. et al., "A Review on ensembles for the class Imbalance Problem: Bagging-, Boosting-, and Hybrid-Based Approaches", IEEE Transactions on Systems, Man, and Cybernetics, Part C, Jul. 2012 (Date of Publication Aug. 2011), vol. 42, No. 4, pp. 463-484 <DOI:10.1109/TSMCC.2011.2161285>.

Gao, J. et al., "A General Framework for Mining Concept-Drifting Data Streams with Skewed Distributions", Proceedings of the SIAM International Conference on Data Mining (Minneapolis, MN, Apr. 26-28, 2007), 2007, pp. 3-14.

Ghazikhani, A. et al., "Ensemble of online neural networks for non-stationary and imbalanced data streams", Neurocomputing, Dec. 2013 (available online Jun. 2013), vol. 122, pp. 535-544 <DOI:10.1016/j.neucom.2013.05.003>.

Guo, H. et al., "Learning from Imbalanced Data Sets with Boosting and Data Generation: The DataBoost—IM Approach", ACM SIGKDD Explorations Newsletter—Special Issue on Learning from Imbalanced Datasets, Jun. 2004, vol. 6, No. 1, pp. 30-39 <DOI:10.1145/1007730.1007736>.

He, H. et al., "Learning from Imbalanced Data", IEEE Transactions on Knowledge and Data Engineering, Sep. 2009 (date of publication Jun. 2009), vol. 21, No. 9, pp. 1263-1284 <DOI:10.1109/TKDE.2008.239>.

Iba, W. et al., "Induction of one-level decision trees", Machine Learning Proceedings, 1992 (available online Jun. 2014), pp. 233-240 <DOI:10.1016/B978-1-55860-247-2.50035-8>.

IBM, "C&RT Algorithms", in "IBM SPSS Modeler 15 Algorithms Guide" (2012), pp. 57-69.

IBM, "CHAID Algorithms", in "IBM SPSS Modeler 15 Algorithms Guide" (2012), pp. 70-82.

IBM, "Quest Algorithms", in "IBM SPSS Modeler 15 Algorithms Guide" (2012), pp. 300-311.

IDC., "IDC Predicts the 3rd Platform Will Bring Innovation, Growth, and Disruption Across All Industries in 2015" [online], Dec. 2014 [retrieved on Oct. 24, 2019 from archive.org, as it appeared on Dec. 26, 2014], retrieved from the internet: <URL:http://www.idc.com/getdoc.jsp?containerId=prUS25285614>.

Jamali, I. et al., "Feature Selection in Imbalance data sets", International Journal of Computer Science Issues, May 2012, vol. 9, No. 3, pp. 42-45.

Japkowicz, N. et al., "The class imbalance problem: A systematic study", Intelligent Data Analysis, Oct. 2002, vol. 6, No. 5, pp. 429-449.

Japkowicz, N., "The Class Imbalance Problem: Significance and Strategies", International Conference on Artificial Intelligence (Las Vegas, NV, 2000), 2000, vol. 1, pp. 111-117.

Joshi, M. et al., "Evaluating boosting algorithms to classify rare classes: comparison and improvements", Proceedings of IEEE International Conference on Data Mining (San Jose, CA, Nov. 29-Dec. 2, 2001), 2001 (date added to IEEE Xplore Aug. 2002), pp. 257-264 <DOI:10.1109/ICDM.2001.989527>.

Kohavi, R., "Scaling Up the Accuracy of Naïve_Bayes Classifiers: a Decision-Tree Hybrid", KDD'96 Proceedings of the Second International Conference on Knowledge Discovery and Data Mining (Portland, OR, Aug. 2-4, 1996), 1996, pp. 202-207.

Lalonde, K., "Investigations into the analysis of remote sensing images with a growing neural gas pattern recognition algorithm", Proceedings of the IEEE International Joint Conference on Neural Networks (Monteral, Quebec, Jul. 31-Aug. 4, 2005), 2005 (date added to IEEE Xplore: Dec. 2005), pp. 1698-1703 <DOI:10.1109/IJCNN.2005.1556135>.

Lattibeaudiere, A., "A USD 4.5 trillion global impact", Connected Living Lating America Summit, 2012, 19 pages.

Liaw, A. et al., "Classification and regression by randomForest", R News, Dec. 2002, vol. 2, No. 3, pp. 18-22.

Lichtenwalter, R. et al. "Learning to Classify Data Streams with Imbalanced Class Distributions", New Frontiers in Applied Data Mining, 2009, 11 pages.

Manyika, J. et al., "Disruptive technologies: Advances that will transform life, business, and the global economy", McKinsey Global Institute, May 2013, 176 pages.

Markets and Markets., "Industrial IoT Market by Device & Technology (Sensor, RFID, Industrial Robotics, DCS, Condition Monitoring, Smart Meter, Camera System, Networking Technology), Software (PLM, MES, SCADA), Vertical, and Geography—Global Forecast to 2023" [online], Markets and Markets, 2014 [retrieved on Oct. 24, 2019 from archive.org, as it appeared on Nov. 20, 2014], retrieved from the internet: <URL:http://www.marketsandmarkets.com/Market-Reports/industrial-internet-of-things-market-129733727.html>.

Mazurowski, M. et al., "Training neural network classifiers for medical decision making: The effects of imbalanced datasets on classification performance", Neural Networks, Mar.-Apr. 2008 (available online Dec. 2007), vol. 21, No. 2-3, pp. 427-436 <DOI:10.1016/j.neunet.2007.12.031>.

(56) References Cited

OTHER PUBLICATIONS

Miller, A. et al.,"Star/galaxy classification using Kohonen self-organizing maps", Monthly Notices of the Royal Astronomical Society, Mar. 1996, vol. 279, No. 1, pp. 293-300 <DOI:10.1093/mnras/279.1.293>.
Moro, S. et al., "A data-driven approach to predict the success of bank telemarketing", Decision Support Systems, Jun. 2014 (available online Mar. 2014), vol. 62, pp. 22-31 <DOI:10.1016/j.dss 2014.03.001>.
Oh, S-H., "Error back-propagation algorithm for classification of imbalanced data", Neurocomputing, Feb. 2011 (available online Jan. 2011), vol. 74, No. 6, pp. 1058-1061 <DOI:10.1016/j.neucom. 2010.11.024>.
Press, G., "6 Predictions For The $125 Billion Big Data Analytics Market in 2015" [online], Forbes, Dec. 2014 [retrieved on Oct. 24, 2019 from archive.org, as it appeared on Dec. 13, 2014], retrieved from the internet: <URL:http://www.forbes.com/sites/gilpress/2014/12/11/6-predictions-for-the-125-billion-big-data-analytics-market-in-2015/>.
Roy, A. et al., "Methods for pattern selection, class-specific feature selection and classification for automated learning", Neural Networks, May 2013 (available online Jan. 2013), vol. 41, pp. 113-129 <DOI:10.1016/j.neunet.2012.12.007>.
Roy, A., "A Classification Algorithm for High-dimensional Data", Procedia Computer Science, Aug. 2015, vol. 53, pp. 345-355 <DOI: 10.1016/j.procs.2015.07.311>.
Satuluri, N. et al., "A Novel Class Imbalance Learning Using Intelligent Under-Sampling", International Journal of Database Theory and Application, Sep. 2012, vol. 5, No. 3, pp. 25-35 <DOI:10.1007/s13748-012-0038-2>.
Shukla, M. et al., "Stream Data Mining and Comparative Study of Classification Algorithms", International Journal of Engineering Research and Information, Jan.-Feb. 2013, vol. 3, No. 1, pp. 163-168.
Tang, Y. et al., "SVMs Modeling for Highly Imbalanced Classification", IEEE Transactions on Systems, Man, and Cybernetics, Part B (Cybernetics), Feb. 2009 (date of publication Dec. 2008), vol. 39, No. 1, pp. 281-288 <DOI:10.1109/TSMCB.2008.2002909>.
Wang, S. et al., "Multiclass Imbalance Problems: Analysis and Potential Solutions", IEEE Transactions on Systems, Man, and Cybernetics, Part B, Aug. 2012 (date of publication Mar. 2012), vol. 42, No. 4, pp. 1119-1130 <DOI:10.1109/TSMCB.2012.2187280>.
Wasikowski, M. et al., "Combating the Small Sample Class Imbalance Problem Using Feature Selection", IEEE Transactions on Knowledge and Data Engineering, Oct. 2010 (date of publication Oct. 2009), vol. 22, No. 10, pp. 1388-1400 <DOI:10.1109/TKDE. 2009.187>.
Zhang, Y. et al., "Parallel Classification Ensemble with Hierarchical Machine Learning for Imbalanced Classes", International Conference on Machine Learning and Cybernetics (Kunming, China, Jul. 12-15, 2008), 2008 (Date added to IEEE Xplore: Sep. 2008), pp. 94-99 <DOI:10.1109/ICMLC.2008.4620385>.
Zhang, Y. et al., "Using ensemble methods to deal with imbalanced data in predicting protein—protein interactions", Computational Biology and Chemistry, Feb. 2012 (available online Jan. 2012), vol. 36, pp. 36-41 <DOI:10.1016/j.compbiolchem.2011.12.003>.
Zhao, Z-Q., "A novel modular neural network for imbalanced classification problems", Pattern Recognition Letters, Jul. 2009 (available online Jun. 2008), vol. 30, No. 9, pp. 783-788 <DOI:10. 1016/j.patrec.2008.06.002>.
Adhikari, S.P., et al., "Memristor bridge synapse-based neural network and its learning," Neural Networks and Learning Systems, IEEE Transactions, vol. 23, No. 9, (2012), pp. 1426-1435.
Alizadeh, A.A., et al., "Distinct types of diffuse large B-cell lymphoma identified by gene expression profiling," Nature, vol. 403, (2000), pp. 503-511.
Alon, U., et al., "Broad patterns of gene expression revealed by clustering analysis of tumor and normal colon tissues probed by oligonucleotide arrays," Proceedings of the National Academy of Sciences (PNAS), vol. 96, No. 12, (1999), pp. 6745-6750.

Apache Spark MLib, 2015, https://spark.apache.org/docs/1.1.0/mllib-guide.html; (accessed Jul. 30, 2019), 2 pages.
Apache Spark MLib, 2015, https://spark.apache.org/docs/latest/mllib-guide.html, (accessed Aug. 6, 2019), 3 pages.
Apache Spark MLib, 2015, https://spark.apache.org/mllib/, (accessed Jul. 30, 2019), 3 pages.
Bahoura, M., et al., "FGPA-implementation of high-speed MLP neural network," Electronics, Circuits and Systems, ICES, 18th IEEE International Conference, (Dec. 2011), pp. 426-429.
Batchelor, B.G., et al., "Adaptive Discriminant Functions," Pattern Recognition, IEEE Conference Publication, vol. 42, (1968), pp. 168-178.
Bauer, E., et al., "An Empirical Comparison of Voting Classification Algorithms: Bagging, Boosting, and Variants," Machine Learning, vol. 35, (1999), pp. 1-38.
Broomhead, D., et al., "Multivariable Function Interpolation and Adaptive Networks," Complex Systems, vol. 2, (1998), pp. 321-355.
Bu, H.L., et al., "Reducing Error of Tumor Classification by Using Dimension Reduction with Feature Selection," Lecture Notes in Operations Research, (2007), pp. 232-241.
Chen, S., et al., "Orthogonal least squares learning algorithm for radical basis function networks," Neural Networks, IEEE Transactions, vol. 2, No. 2, (1991), pp. 302-309.
Cooper, P.W., "A Note on Adaptive Hypersphere Decision Boundary," IEEE Transactions on Electronic Computers, (Dec. 1966), pp. 948-949.
Cooper, P.W., "The Hypersphere in Pattern Recognition," Information and Control, vol. 5, (1962), pp. 324-346.
Dai, J.J., et al., "Dimension reduction for classification with gene expression data," Statistical Applications in Genetics and Molecular Biology, vol. 5. No. 1, (2006).
Decherchi, S., et al., "Efficient digital implementation of extreme learning machines for classification," Circuits and Systems II: Express Briefs, IEEE Transactions, vol. 59. No. 8, (2012), pp. 496-500.
Dettling, M., "BagBoosting for tumor classification with gene expression data," Bioinformatics, vol. 20, No. 18, (2004), pp. 3583-3593.
Domingos, P., "Using Partitioning to Speed Up Scientific-to-General Rule Induction," Proceedings of the AAAI-96 Workshop on Integrating Multiple Learned Models, (1996), pp. 29-34.
Dudoit, S., et al., "Comparison of discrimination methods for the classification of tumors using gene expression data," Journal of the American Statistical Association, vol. 97, No. 457, (2002), pp. 77-87.
Extended European Search Report for European Patent Application No. 16818438.0, dated Feb. 11, 2019, 11 pages.
Franklin, M., "The Berkeley Data Analytics Stack: Present and Future," Big Data, 2013 IEEE International Conference, (Oct. 2013), pp. 2-3.
Furber, S., et al., "Overview of the SpiNNAker system architecture," IEEE Transactions on Computers, vol. 62, No. 12, (Dec. 2013), pp. 2454-2467.
Furber, S.B., et al., "The SpiNNaker Project," IEEE Proceedings, vol. 102, No. 5, (May 2014), pp. 652-665.
Glocer, K., et al., "Online feature selection for pixel classification," Proceedings of the 22nd International Conference on Machine Learning, (Aug. 2005), pp. 249-256.
Golub, T., et al., "Molecular classification of cancer: Class discovery and class prediction by gene expression," Science, vol. 286, (1999), pp. 531-537.
Hikawa, H., "FGPA implementation of self organizing map with digital phase locked loops," Neural Networks, vol. 18, No. 5, (2005), pp. 514-522.
Hoi, S.C., et al., "Online feature selection for mining big data," Proceedings of the 1st International Workshop on Big Data, Streams, Heterogeneous Source Mining: Algorithms, Systems, Programming Models and Applications, (Aug. 2012), pp. 93-100.
Indiveri, G., et al., "Neuromorphic silicon neuron circuits," Front, Neurosci, vol. 5, No. 73, (2011).

(56) References Cited

OTHER PUBLICATIONS

International Preliminary Report on Patentability for International Patent Application No. PCT/US16/37079, dated Jan. 2, 2018, 6 pages.
International Search Report and Written Opinion for International Patent Application No. PCT/US2016/037079, dated Sep. 1, 2016), 8 pages.
Jang, H., et al., "Neural network implementation using cuda and openmp," Digital Image Computing: Techniques and Applications (DICTA), IEEE, (Dec. 2008), pp. 155-161.
Khalifa, B. K., et al., "Parallel FPGA implementation of self-organizing maps," Microelectronics, 2004, ICM 2004 Proceedings, The 16th International Conference, IEEE, (Dec. 2004), pp. 709-712.
Khan, J., et al., "Classification and diagnostic prediction of cancers using gene expression profiling and artificial neural networks," Natural Medicine, vol. 7, No. 6, (2001), p. 673-679.
Kim, S., et al., "Identification of Combination Gene Sets for Glioma Classification," Molecular Cancer Therapeutics, vol. 1, (2002), pp. 1229-1236.
Kohonen, T., "Self-organized formation of topologically correct feature maps," Biological Cybernetics, vol. 43. No. 1, (1982), pp. 59-69.
Krizhevsky, A., et al., "Imagenet classification with deep convolutional neural networks", Advances in Neural Information Processing Systems, (2012), pp. 1097-1105.
Law, M.H., et al., "Incremental nonlinear dimensionality reduction by manifold learning," Pattern Analysis and Machine Intelligence, IEEE Transactions, vol. 28, No. 3, (2006), pp. 377-391.
Li, G.Z., et al., "Partial least squares based dimension reduction with gene selection for tumor classification," Proceedings of the 7th IEEE International Conference on Bioinformatics and Bioengineering, Boston, USA, (2007), pp. 1439-1444.
Li, X.R., et al., "Efficient and robust feature extraction by maximum margin criterion," Neural Networks, IEEE Transactions, vol. 17 No. 1, (2006), 157-165.
Mailachalam, B., "Area-time issues in the VLSI implementation of self organizing map neural networks," Microprocessors and Microsystems, vol. 26, No. 9, (2002), pp. 399-406.
Misra, J., et al., "Artificial neural networks in hardware: A survey of two decades of progress," Neurocomputing, vol. 74, No. 1, (2010), pp. 239-255.
Monroe, D., "Neuromorphic computing gets ready for the (really) big time," Communications of the ACM, vol. 57, No. 6, (2014), pp. 13-15.
Moody, J., et al., "Learning with Localized Receptive Fields," Proceedings of the 1988 Connectionist Modles Summer School, Morgan-Kaufmann, San Mateo, (1988), pp. 133-143.
Musavi, M.T., et al., "On the Training of Radial Basis Function Classifiers," Neural Networks, vol. 5, No. 4, (1992), pp. 595-603.
Oh, K.S., et al., "GPU implementation of neural networks," Pattern Recognition, 37(6), 2004, pp. 1311-1314.
Optiz, D., "Popular Ensemble Methods: An Empirical Study," Journal of Artificial Research, 11, 1999, pp. 169-198.
Painkras, E., et al., "A 1W 18-core System-on-Chip for Massively-Parallel Neural Network Simulation," IEEE Journal of Solid-State Circuits, Aug. 2013, pp. 1943-1953.
Pomeroy, S.L., et al., "Prediction of central nervous system of embryonal tumour outcome based on gene expression," Nature, 415(6870), 2002, pp. 436-442.
Poon, C.S., et al., "Neuromorphic silicon neurons and large-scale neural networks: challenges and opportunities," Frontiers in neuroscience, 5, 2011.
Quinlan, J.R., "Bagging, Boosting, and C4.5," Proceedings of the Thirteenth National Conference on Artificial Intelligence, 1996, pp. 725-730.
Reilly, D.L., "An Overview of Neural Networks: Early Models to Real World Systems," An Introduction to Neural and Electronic Networks, Zometzer, S.F., et al., eds., 1990, Academic Press, San Diego, pp. 299-321.
Reilly, D.L., et al., "A Neural Model for Category Learning," Biological Cybernetics, 45, 1982, pp. 35-41.
Rokach, L., "Taxonomy for characterizing ensemble methods in classification tasks: A review and annotated bibliography," Computational Statistics & Data Analysis, 53.12, 2009, pp. 4046-4072.
Roy, A. "Two-layered ensemble Kohonen nets for imbalanced streaming data," 2016 IEEE Congress on Evolutionary Computation (CEC), Vancouver, BC, 2016, pp. 5215-5221.
Roy, A., "A New Learning Theory and Polynomial-time Autonomous learning Algorithms for Generating Radial Basis Function (RBF) Networks," Radial Basis Function Neural Networks: Design and Applications, Howlett, R.J., et al., eds., 2000, pp. 253-280.
Roy, A., "Automated online feature selection and learning from high-dimensional streaming data using an ensemble of Kohonen neurons," 2015 International Joint Conference on Neural Networks (IJCNN), Killarney, 2015, pp. 1-8.
Roy, A., "Autonomous Learning: New Connectionist Algorithms," Tutorial International Joint Conference on Neural Networks (IJCNN 2003), Portland, Jul. 20-24, 2003, 130 pages.
Roy, A., "Autonomous Learning: New Connectionist Algorithms," Tutorial, International Conference on Neural Information Processing (ICONIP '02), Singapore, Nov. 18-22, 2002, 33 pages.
Roy, A., et al., "A Neural Network Learning Theory and a Polynomial time RBF Algorithm" IEEE Transactions on Neural Networks, vol. 8, No. 6, 1997, pp. 1301-1313.
Roy, A., et al., "An Algorithm to Generate Radial Basis Function (RBF)-like Nets for Classification Problems," Neural Networks, vol. 8, No. 2, 1995, pp. 179-202.
Roy, A., et al., "Iterative Generation of Higher-Order Nets in Polynomial time Using Linear Programming," IEEE Transactions on Neural Networks, vol. 8, No. 2, 1997, pp. 402-412.
Roy, A., et al., "Methods for Pattern Selection, Class-Specific Feature Selection and Classification for Automated Learning," Neural Networks, vol. 41, 2013, pp. 113-129.
Saeys, Y., et al., "A review of feature selection techniques in bioinformatics," Bioinformatics, 23, 19, 2007, pp. 2507-2517.
Scofield, C.L., et al., "Pattern class degeneracy in an unrestricted storage density memory," Neural Information Processing Systems, 1988, pp. 674-682, American Institute of Physics.
Seiffert, U., et al., "Multi-dimensional Self-Organizing Maps on massively parallel hardware," Advances in Self-Organizing Maps, 2001, pp. 160-166, Springer London.
Singh, D., et al., "Gene expression correlates of clinical prostate cancer behavior," cancer cell, 1(2), 2002, pp. 203-209.
Singh, S., et al., "Parallel Large Scale Feature Selection for Logistic Regression," SDM, 2009, pp. 1172-1183.
Soares, C., et al., "A class-specific ensemble feature selection approach for classification problems," ACM SE '10 Proceedings of the 48th Annual Southeast Regional Conference No. 33, 2010, 6 pages.
Statnikov, A., et al., "A comprehensive evaluation of multicategory classification methods for microarray gene expression caner diagnosis," Bioinformatics, vol. 21, No. 5, 2005, pp. 631-643.
Stone, M., "Cross-validatory choice and assessment of statistical predictions," Journal of the Royal statistical Society, 36, 1974, pp. 111-147.
Tamukoh, H., et al., "Fast Learning algorithms for self-organizing map employing rough comparison WTA and its digital hardware implementation," IEICE transactions on electronics, 87(11), 2004, pp. 1784-1794.
Tisan, A., et al., "SOM neural network design—A new Simulink library based approach targeting FPGA implementation," Mathematics and Computers in Simulation, 91, 2013, pp. 134-149.
Vale, K., et al., "A Class-Based Feature Selection Method for Ensemble Systems," HIS '08 Proceedings of the 2008 8th International Conference on Hybrid Intelligent Systems, 2008, pp. 596-601.
Westerlund, M.L., "Classification with Kohonen Self-Organizing Maps," Soft Computing, Haskoli Islands, (Apr. 24, 2005), URL: https://notendur.hi.is/benedikt/Courses/Mia_report2.pdf; pp. 1-15.
Wu, X., et al., "Online Streaming Feature Selection," Proceedings of the 27th international conference on machine learning (ICML-10), 2010, pp. 1159-1166.

(56) References Cited

OTHER PUBLICATIONS

Yan, J., et al., "A scalable supervised algorithm for dimensionality reduction on streaming data," Information Sciences, 176(14), 2006, pp. 2042-2065.
Yan, J., et al., "Effective and Efficient Dimensionality Reduction for Large-Scale and Streaming Data Preprocessing," Knowledge and Data Engineering, IEEE Transactions, 18(3), 2007, pp. 320-333.
Zaharia, M., et al., "Spark: Cluster Computing with Working Sets," Proceedings of the 2nd USENIX conference on hot topics in cloud computing, Jun. 2010, pp. 1-7.
Zhao, Z., et al., "Massively parallel feature selection: an approach based on variance preservation," Machine learning, 92(1), 2013, pp. 195-220.

* cited by examiner

METHOD AND APPARATUS FOR LARGE SCALE MACHINE LEARNING

CROSS-REFERENCE TO RELATED APPLICATIONS

This application claims the benefit of U.S. Provisional Application No. 62/186,891, filed Jun. 30, 2015, the entire contents of which are incorporated by reference herein.

BACKGROUND

With the advent of high-dimensional stored big data and streaming data, what is needed is machine learning on a very large scale. It would be advantageous for such machine learning to be extremely fast, scale up easily with volume and dimension, be able to learn from streaming data, automatically perform dimension reduction for high-dimensional data, and be deployable on massively parallel hardware. Artificial neural networks (ANNs) are well positioned to address these challenges of large scale machine learning.

SUMMARY

Embodiments of the invention provide a method for analyzing patterns in a data stream and taking an action based on the analysis. A volume of data is received, and the data is trained to create training examples. Features are selected that are predictive of different classes of patterns in the data, using the training examples. A set of Kohonen networks is trained using the data, based on the selected features. Then, active nodes are identified and extracted from the set of Kohonen nets that are representative of a class of patterns in the data. Classes are assigned to the extracted active nodes. Action may then be taken based on the assigned classes.

DETAILED DESCRIPTION

Figure 1:
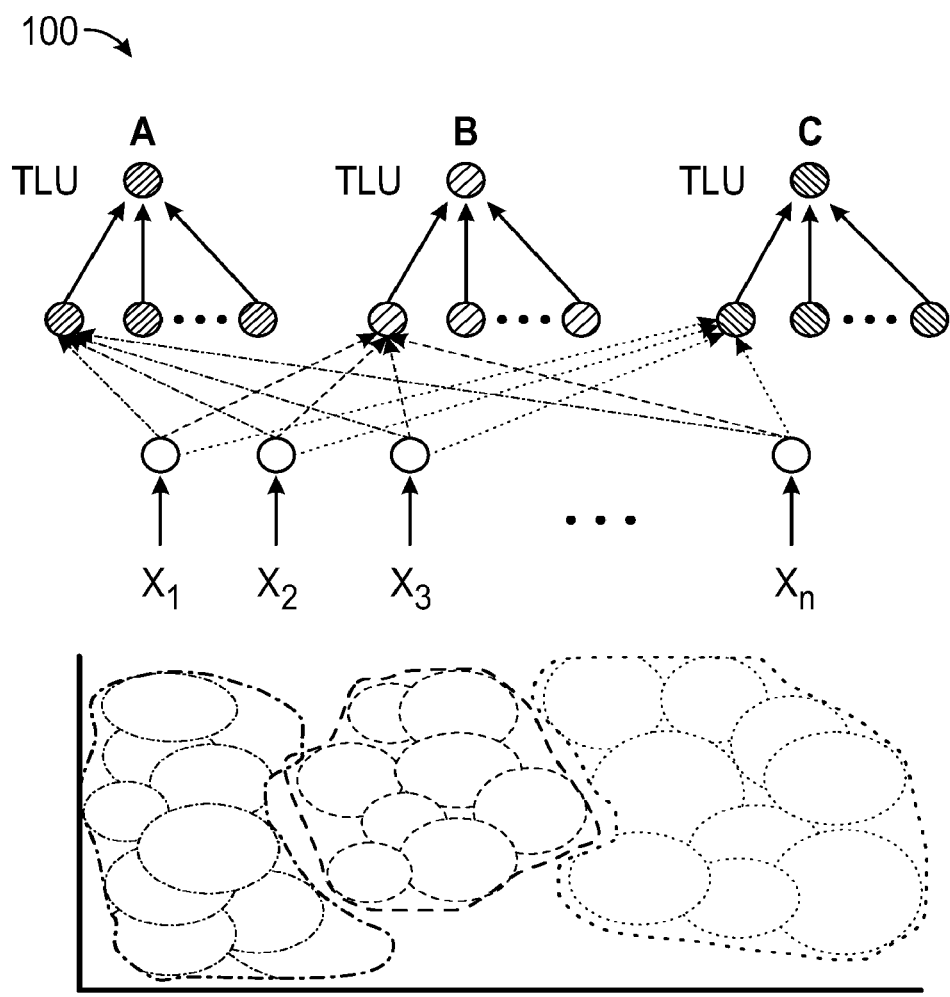
FIG. 1 illustrates hypersphere classification networks in accordance with embodiments of the invention.

Embodiments of the invention provide a method that can effectively handle large scale, high-dimensional data. Embodiments provide an online method that can be used for both streaming data and large volumes of stored big data. Embodiments primarily train multiple Kohonen nets in parallel both during feature selection and classifier construction phases. However, in the end, embodiments of the invention only retain a few selected neurons (nodes) from the Kohonen nets in the classifier construction phase; the embodiments discard all Kohonen nets after training. Embodiments use Kohonen nets both for dimensionality reduction through feature selection and for building an ensemble of classifiers using single Kohonen neurons. Embodiments are meant to exploit massive parallelism and should be easily deployable on hardware that implements Kohonen nets. Further embodiments also provide for the method to handle imbalanced data. The artificial neural network introduced by Finnish professor Teuvo Kohonen in the 1980s is sometimes called a Kohonen map or network. A Kohonen network is a self-organizing map (SOM) or self-organizing feature map (SOFM) which is a type of artificial neural network (ANN) that is trained using unsupervised learning to produce a low-dimensional (typically two-dimensional), discretized representation of the input space of training samples, called a map. Self-organizing maps are different from other artificial neural networks because they apply competitive learning, as opposed to error-correction learning (such as back propagation with gradient descent), and because they use a neighborhood function to preserve the topological properties of the input space. This makes SOMs useful for visualizing low-dimensional views of high-dimensional data, akin to multidimensional scaling. Kohonen nets do not require target outputs for each input vector in the training data, inputs are connected to a two-dimensional grid of neurons, or nodes, and multi-dimensional data base be mapped onto a two-dimensional surface.

Streaming data is data that is generated continuously by many, perhaps thousands, of data sources, which typically transmit data records simultaneously, and in small sizes, on the order of kilobytes. Streaming data includes a wide variety of data such as log files generated by customers using mobile or web applications, e-commerce purchases, in-game player activity, information from social networks, financial trading floors, geospatial services, gene expression datasets, telemetry and/or sensor data obtained from connected devices or instrumentation in data centers, and Internet of Things (IoT) data from everyday objects that have internetwork connectivity. This streaming data, often times received and processed in real-time, or near real-time, is processed sequentially and incrementally on a record-by-record basis, or over sliding time windows, and used for a wide variety of analytics including correlations, aggregations, filtering, and sampling. Streaming data processing is beneficial in most scenarios where new, dynamic data is generated on a continual basis. It applies to many industry segments and big data use cases. Companies generally conduct data analysis, including applying machine learning algorithms, and extract deeper insights from the data. Stored data, by contrast, is historical—it has been gathered and stored, in a permanent memory(s) or storage device(s), for later retrieval and processing by a computing platform that has access to the permanent memory or storage device.

1. INTRODUCTION

The arrival of big and streaming data is causing major transformations within the machine learning field. For example, there are significantly more demands on machine learning systems, from the requirement to learn, and learn quickly, from very large volumes of data, to the requirement for automation of machine learning to reduce the need for expert (human) involvement and for deployment of machine learning systems on massively parallel hardware. Traditional artificial neural network (ANN) algorithms ("neural network algorithms", "neural net algorithms") have many properties that can meet these demands of big data and, therefore, can play a role in the major transformations that are taking place.

For example, the learning mode of many neural net algorithms is online, incremental, learning—a mode that does not require simultaneous access to large volumes of data. This mode of learning not only resolves many computational issues associated with learning from big data, it also removes the headache of correctly sampling from large volumes of data. It also makes neural net algorithms highly scalable and allows such to learn from all of the data. This mode of learning is also useful when working with streaming data, where none or very little of the data may actually be stored and a learning system may only have a brief look at the data that flows through the system.

Neural network algorithms also have the advantage of using very simple computations that can be highly parallelized. Thus, they are capable of exploiting massively parallel computational facilities to provide very fast learning and response times. There are many implementations of neural network algorithms on graphics processing units (GPUs) that exploit parallel computations. Neuromorphic hardware, especially meant for neural network implementation, is also becoming available. Kohonen networks, or simply, Kohonen nets, used in embodiments of the invention, generally is a type of single layer net with its own hardware implementation(s). In general, embodiments of the invention are hardware implementations of neural network algorithms to handle high velocity streaming data. Such hardware implementations can also process stored big data in a very fast manner. All of these features of neural network algorithms position the field to become the backbone of machine learning in the era of big and streaming data.

Embodiments of the invention provide a new and novel neural network learning method that (1) can be parallelized at different levels of granularity, (2) addresses the issue of high-dimensional data through class-based feature selection, (3) learns an ensemble of classifiers using selected Kohonen neurons (or Kohonen "nodes") from different Kohonen nets, (4) can handle imbalanced data, and (5) can be implemented on hardware.

Figure 5:
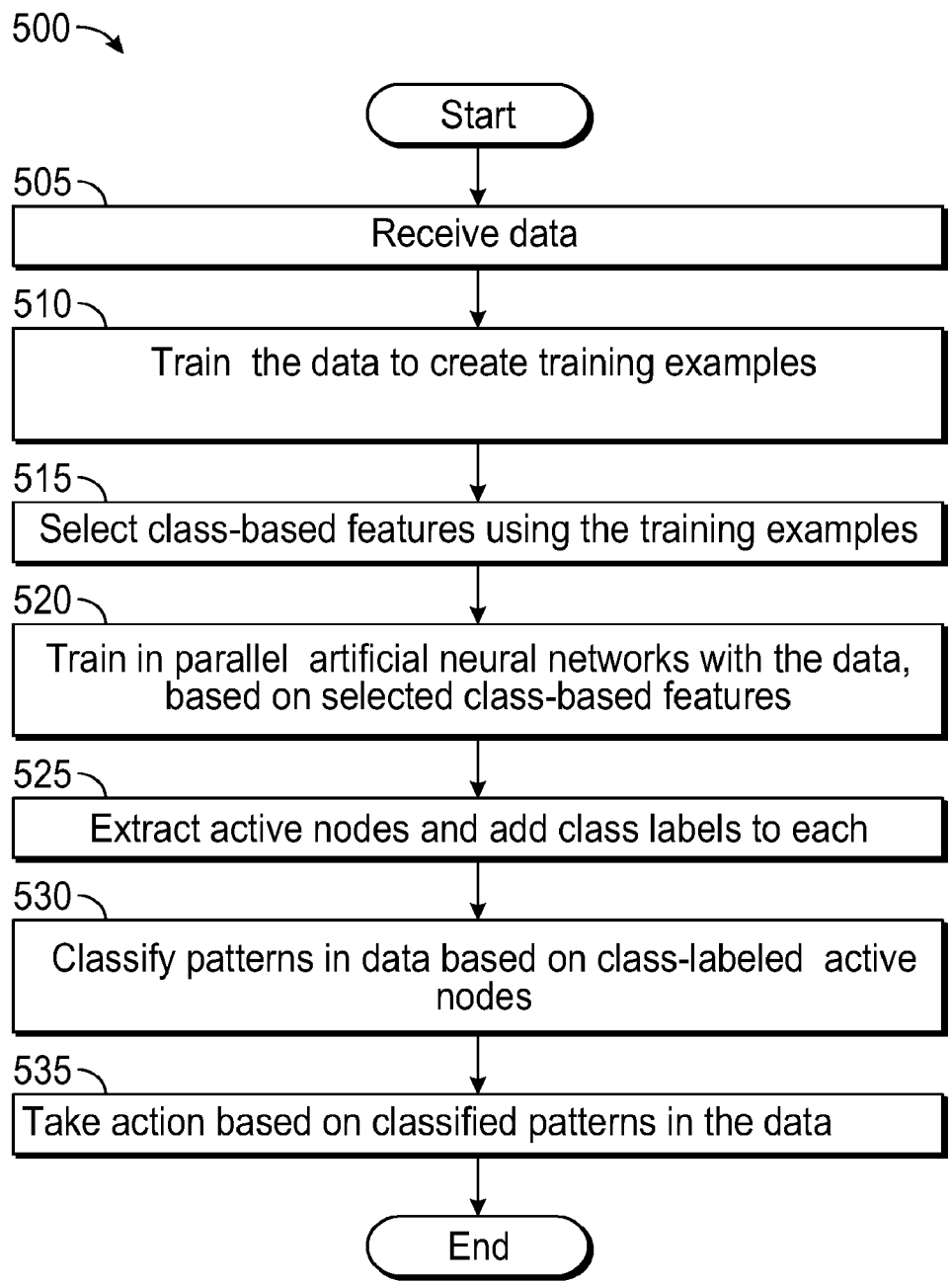
FIG. 5 is a flow chart in accordance with an embodiment of the invention.

With regard to the second above-noted objective of dimensionality reduction through feature selection, and further with reference to FIG. 5, the method 500 receives a volume of data, for example, a stream of high dimensional data at 505, or from a store of historical data, and trains the data to create training examples. For example, in one embodiment, the method trains a number of Kohonen nets in parallel with streaming data to create some representative data points, also referred to as training samples or training examples, at 510. (It should be noted that stored data can also be received, either from a memory or permanent store accessible to a hardware based computing platform or software based computing platform executing code that accesses the memory or permanent store, or streamed from the memory or permanent store accessible to the computing platform). Using Kohonen nets, in one embodiment, the method performs class-based feature selection at 515. For selection of features for each class, the basic criteria are that (1) the method makes the class more compact, and (2) at the same time, the method maximizes the average distance from the other classes. The method discards, insofar as they are used in creating training samples, all Kohonen nets once class-specific feature selection is complete. In a second phase, the method constructs several new Kohonen nets in parallel in different feature spaces, again from the data, based on the selected class-based features, at 520. Once these Kohonen nets are trained, at 525, the method extracts just the active neurons (or active "nodes") from them, adds class labels to each of the active neurons and creates an ensemble of Kohonen neurons for classification. In the end, the method retains just a set of dangling active Kohonen neurons from different Kohonen nets in different feature spaces and discards the Kohonen nets themselves. The retained set of class-labeled active nodes can then be used to classify patterns in the data at 530, and some action taken based on the classified patterns in the streaming data, at 535.

In imbalanced data problems, such as fraud detection, there exist very few data points for one or more classes, but lots of data points are available for the other classes. Dealing with imbalanced data problems has always been difficult for classification algorithms and dealing with the streaming version of imbalanced data is particularly challenging. An additional embodiment of the invention provides a method that handles imbalanced data problems by creating a second layer of Kohonen nets, as described in more detail below.

In the description that follows, section 2 provides an overview of the concepts used in embodiments of the invention including class-specific feature selection and hypersphere nets. Section 3 describes an algorithm that, according to embodiments of the invention, uses Kohonen nets in parallel for class-specific feature selection from streaming data. Sections 4 and 5 provide details of how an ensemble of hypersphere nets is constructed using neurons from different Kohonen nets, according to various embodiments of the invention. Section 6 presents computational results for several high-dimensional problems, according to an embodiment of the invention. Section 7 describes an embodiment of the invention including an algorithm for imbalanced data problems and some related computational results. Section 8 discusses hardware implementation of embodiments of the invention, and conclusions are discussed in Section 9.

2. OVERVIEW OF THE CONCEPTS AND MOTIVATION BEHIND EMBODIMENTS OF THE INVENTION

Figure 2:
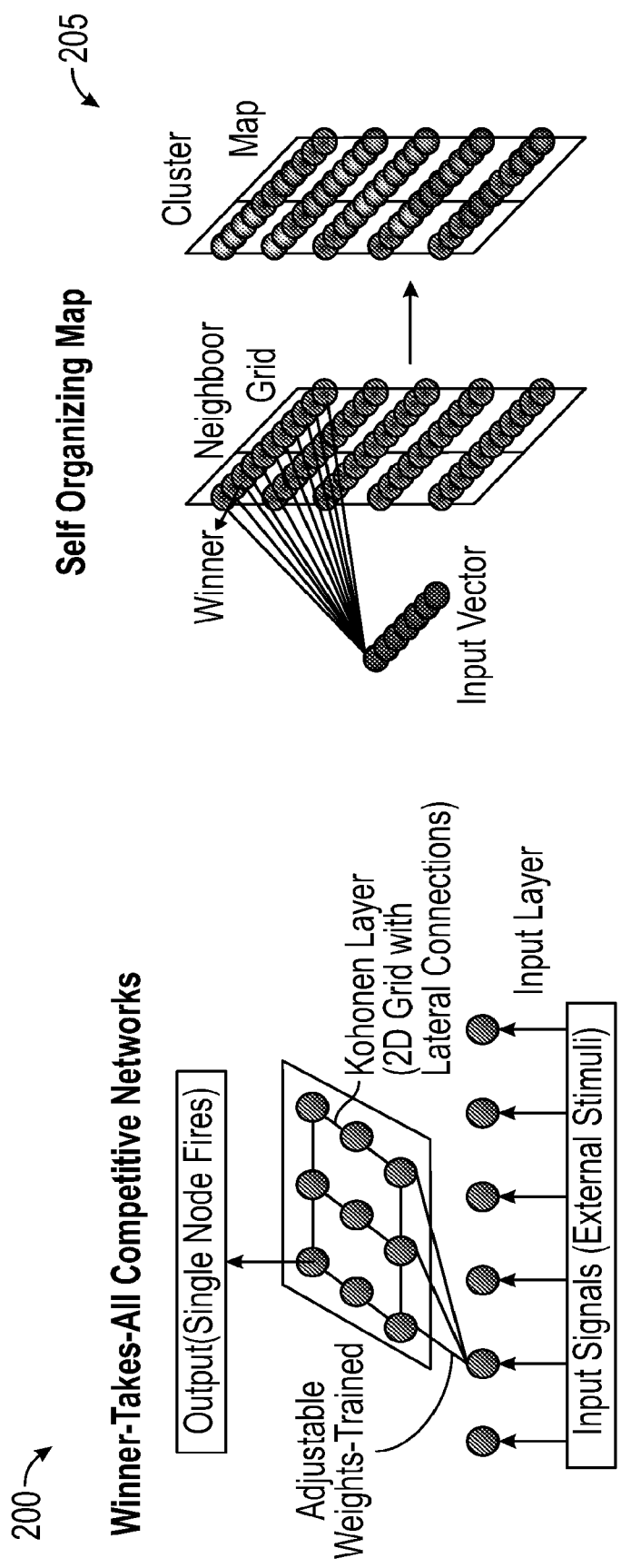
FIG. 2 illustrates the general architecture of a Kohonen network as used in embodiments of the invention.

Embodiments of the invention use a method that creates hypersphere classification networks A, B and C, illustrated in the embodiment 100 in FIG. 1, in reduced feature spaces by constructing a series of Kohonen nets from streaming data in those reduced feature spaces. The general architecture of a Kohonen network, or self-organizing map (SOM), is shown in FIG. 2 at 200 and 205. In the network depicted at 200, only three connections are shown for purposes of clarity. Embodiments of the invention discard all Kohonen nets in the end and retain only certain Kohonen neurons from these nets as hyperspheres. According to an embodiment, the method is parallelized, and, in each of two phases (a feature selection phase and then a classifier construction phase), all of the Kohonen nets can be constructed in parallel.

2.1 Hypersphere Classification Nets

As shown in FIG. 1, a hypersphere classification net 100 has one hidden layer and one output layer for classification. In terms of computing speed, this shallow architecture has great advantage, especially when compared to multiple hidden layer nets.

Figure 3:
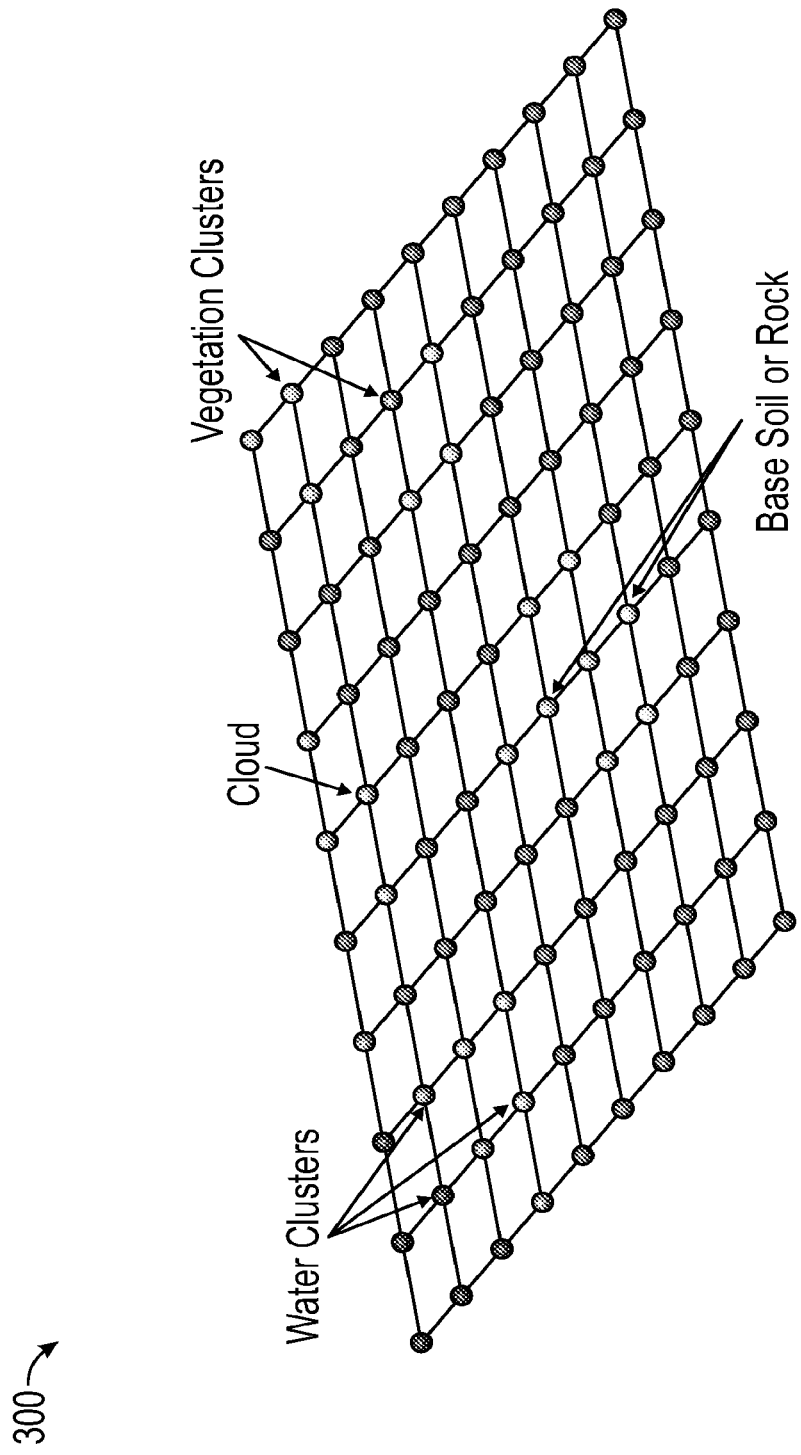
FIG. 3 illustrates adding classes to nodes in a Kohonen network according to embodiments of the invention.

A prior art method constructs hypersphere nets in an offline mode. Constructing hypersphere nets in an online mode is a considerable challenge and embodiments of the invention utilize Kohonen nets as the underlying mechanism to do so. After class-specific feature selection, one embodiment constructs Kohonen nets in reduced feature spaces with streaming data. After training these Kohonen nets, one embodiment 300 adds class labels to individual neurons (or "nodes"), whenever possible, as shown in FIG. 3. The embodiment assigns an individual neuron to a particular class if a majority of the streaming data points for which it is the winning or best neuron belongs to that class. The radius of activation of such a neuron is equal to the distance of the furthest data point of the particular class the neuron is assigned to and for which the neuron is also the winning neuron. It discards neurons that are not assigned to any class. Described thus far are the main concepts of the process of constructing hypersphere nets from Kohonen nets. The following description presents further details of embodiments of the invention.

2.2 Class-Specific Feature Selection and Dimensionality Reduction

One of the fundamental challenges for machine learning systems for high-dimensional streaming data is dimensionality reduction. Many of the prior art feature extraction methods, such as Principal Component Analysis (PCA) and Linear Discriminant Analysis (LDA), do not perform very well on high-dimensional data. A number of other prior art methods have been developed in recent few years for both online feature selection and feature extraction for high-dimensional streaming data. One prior art method considers an online learning problem where the training instances arrive sequentially, but the number of active features that a learning system can use is fixed. Other prior art approaches present a method for streaming features where candidate features arrive one at a time and the learning system has to select the best set of features. However, all the training examples are available before the start of training. Yet another approach presents two methods for dimensionality reduction based on the orthogonal centroid algorithm—an online, incremental one for feature extraction and an offline one for feature selection. Another prior art approach proposes an online extension of the Maximum Margin Criterion (MMC) to handle streaming data. Finally, one prior art approach presents an online version of Isometric Feature Mapping (ISOMAP), a nonlinear dimensionality reduction method.

One prior art approach presents a parallel distributed feature selection algorithm for distributed computing environments that preserves the variance contained within the data. It can perform both supervised (based on human input) and unsupervised (automatic) feature selection and uses data partitioning for large amounts of data. A different approach proposes a highly scalable feature selection algorithm for logistic regression that can be parallelized by partitioning both features and records within a Map Reduce framework. This approach ranks features by estimating the coefficients of the logistic regression model.

However, none of these prior art approaches are class-specific feature selection methods for streaming data, although the idea of class-specific extracted features (i.e., projected subspaces) has existed for some time. Recently, prior art approaches have used the idea of class-specific feature selection in ensemble learning. One prior art approach proposed methods that use a subset of the original features in class-specific classifiers. However, none of these prior art methods are appropriate for streaming data.

Embodiments of the invention use class-specific feature selection for dimensionality reduction. The advantage in preserving the original features of a problem is that, quite often, those features have meaning and interpretation, while such meaning is usually lost in extracted or derived features. In class-specific feature selection, the algorithm finds separate feature sets for each class such that they are the best ones to separate that class from the rest of the classes. This criterion for identifying good class-specific features is similar to that used in LDA and Maximum Margin Criterion (MMC), which are feature extraction methods. LDA, MMC, and other similar feature extraction methods maximize the between-class scatter and minimize the within-class scatter. In other words, those methods try to maximize the distance between different class centers and at the same time make the data points in the same class as close as possible. Embodiments of the invention, although not based on a feature extraction method, are based on a similar concept. The feature selection criterion is also similar to that of a prior art approach that preserves the variance contained within the data.

In the prior art offline mode for constructing hypersphere nets, where a collection of data points is available, it is straightforward to select features that maximize the average distance of data points of one class from the rest of the classes and also, at the same time, minimize the average distance of data points within that class. One such approach ranks and selects features on that basis and computational experiments show that it also works for high-dimensional problems. However, that prior art method cannot be used directly on streaming data, that is, where no data is stored. Embodiments of the invention operate on streaming data using the same concept for feature selection, but rely on Kohonen nets to do so. By training multiple Kohonen nets from streaming data, some representative data points (or "training examples") are created for each class and that is how to resolve the dilemma of not having access to a collection of data points. Given a collection of representative data points (represented by certain Kohonen neurons in the Kohonen nets), it is possible to use a class-based feature selection method.

3. KOHONEN NETWORK BASED CLASS-SPECIFIC FEATURE SELECTION FOR STREAMING DATA 3.1 Concept of Separability Index for Feature Ranking by Class Suppose there are kc total classes. The basic feature ranking criteria are that (1) a good feature for class k should produce good separation between patterns in class k and those not in class k, k=1 . . . kc, and (2) also make the patterns in class k more compact. Based on this idea, a measure called the separability index that can rank features for each class has been proposed. Suppose $d_{kn}^{in}$ is the average distance between patterns within class k for feature n, and $d_{kn}^{out}$ the average distance between the patterns in class k and those not in class k for feature n. One approach uses the Euclidean distance for distance measure, but other distance measures could be used. The separability index of feature n for class k is given by $r_{kn} = d_{kn}^{out}/d_{kn}^{in}$. One may use this separability index $r_{kn}$ to rank order features of class k where a higher ratio implies a higher rank. The sense of this measure is that a feature n with a lower $d_{kn}^{in}$ makes class k more compact and with a higher $d_{kn}^{out}$ increases the separation of class k from the other classes. Thus, the higher the ratio $r_{kn}$ for a feature n, the greater is its ability to separate class k from the other classes and the better the feature.

3.2 Computing Separability Indices for High-Dimensional Streaming Data

Figure 4:
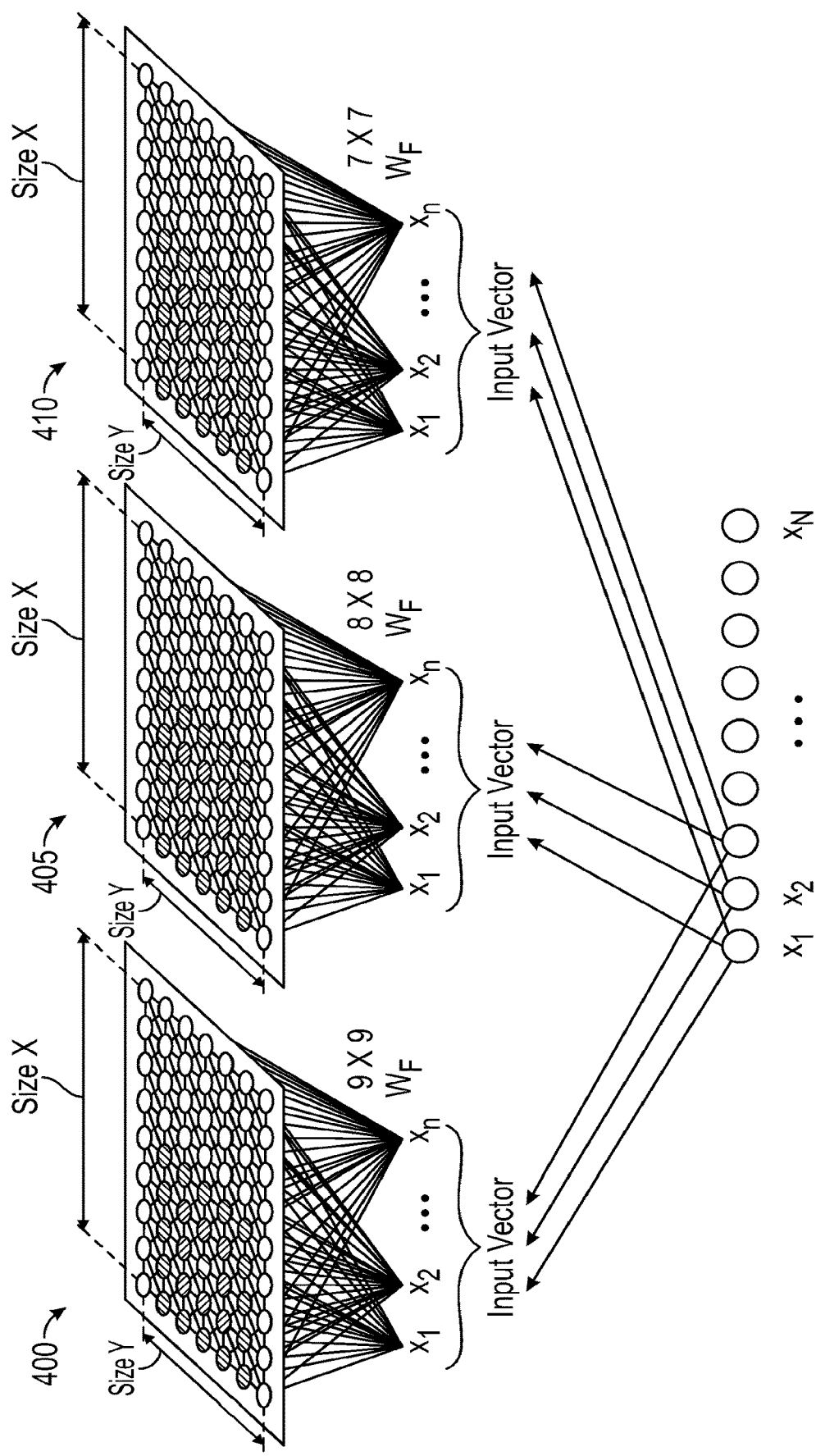
FIG. 4 illustrates an embodiment of the invention that trains different Kohonen nets, of different grid sizes, and for different feature subsets, in parallel on a distributed computing platform.

The challenge with online learning from streaming data is that there is not access to a stored set of training examples to compute separability indices. (The assumption here is that none of the streaming data is stored.) Embodiments of the invention use Kohonen nets to solve this problem; Kohonen nets serve as collectors of representative training examples. One embodiment trains many different Kohonen nets, of different grid sizes, and for different feature subsets, in parallel on a distributed computing platform, as illustrated in FIG. 4. One implementation of this embodiment uses Apache Spark as the distributed computing platform, but other similar platforms can be used. A Kohonen net forms clusters and the cluster centers (that is, the active Kohonen net nodes or neurons) are equivalent to representative examples of the streaming data. One embodiment then uses these representative examples to compute the separability indices of the features by class.

3.3 Exploiting Parallel Distributed Computing to Construct Kohonen Nets

Suppose the N-dimensional vector x, $x=(X_1, X_2, \ldots, X_N)$ represents an input pattern in the streaming data and $X_n$ denote the $n^{th}$ element of the vector x. Let $FP_q$ denote the $q^{th}$ feature subset, q=1 ... FS, where FS is the total number of feature subsets. Let $KN_q^g$ be the $g^{th}$ Kohonen net of a certain grid size for the $q^{th}$ feature subset, q=1 ... FS, g=1 ... FG, where FG is the total number of different Kohonen net grid sizes. kc denotes the total number of classes and k is a class.

Assume that the method, according to one embodiment of the invention, has access to parallel distributed computing facilities to compute the separability indices efficiently and quickly for high-dimensional streaming data. Suppose that the embodiment trains Kohonen nets of 10 different grid sizes for each feature subset (e.g. Kohonen net grid sizes of 9×9, 8×8, 7×7 and so on, as depicted in FIG. 4 at 400, 405, and 410, respectively; FG=10) and also assume that it has computing resources to build 500 Kohonen nets in parallel. In that case, FS, the total number of feature subsets, would be 50 (=500/10) and $KN_1^1 \ldots KN_{50}^{10}$ would denote the 500 different Kohonen nets. Further suppose that there are 1000 features in the data stream (N=1000). It would, therefore, partition the feature set randomly into 50 subsets of 20 features each (FS=50; N=20*FS). For simplicity, assume that the first feature partition $FP_1$ include the features $X_1 \ldots X_{20}$, the second feature partition $FP_2$ include the features $X_{21} \ldots X_{40}$ and so on. For Kohonen nets for the first feature partition $FP_1$ ($KN_1^g$, g=1 ... 10), the input vector would be the feature vector $FP_1$, for Kohonen nets for the second feature partition $FP_2$ ($KN_2^g$, g=1 ... 10), the input vector would be the feature vector $FP_2$, and so on. Thus, for each feature subset $FP_q$, 10 different Kohonen nets of different grid sizes would be trained. If there are just a few classes in the classification problem, smaller grid sizes should suffice (e.g. grid sizes of 9×9, 8×8, 7×7 and so on). If there are thousands of classes, then larger grid sizes would be used.

The use of feature partitions is, essentially, for efficiency and speed because Kohonen nets can be trained with low-dimensional input vectors much faster and in parallel compared to a single net that is trained with thousands of features. And the reason for using different grid sizes for the same feature partition is to get different representative examples to compute the separability indices. The method repeats this overall process of computing separability indices a few times by randomly selecting features for each feature partition, according to one embodiment. The method then uses the maximum separability index value of each feature over these repetitions for final ranking of the features.

3.4 Assigning Class Labels to Kohonen Neurons to Compute Separability Indices

According to embodiments of the invention, not all, but some of the active nodes of Kohonen nets trained for different feature partitions serve as representative training examples of different classes and are used to compute the separability indices. One embodiment considers only the winning or best neurons of the Kohonen nets to be active nodes. Once the Kohonen nets stabilize during initial training, the embodiment processes some more streaming data to assign class labels to the active nodes. In this phase, as the embodiment processes some more streaming data, it does not change the weights of the Kohonen nets but only keeps count of the number of times an input pattern of a particular class activated a particular neuron (i.e., the neuron was the winning neuron for those input patterns). For example, given there are two classes, A and B, for each active node, the method keeps count of the number of times input patterns from each of these two classes activates the node. Suppose class A patterns activate one such neuron (node) 85 times and class B patterns activate the node 15 times. At this node then, approximately 85% of the activating input patterns belong to class A and 15% belong to class B. Since a significant majority of the activating patterns belong to class A, the method simply assigns this active neuron to class A. Assigning an active neuron to a class simply means that that neuron represents an example of that class. As an example when an active neuron is discarded, suppose class A patterns activate a node 55% of the time and class B patterns activate the node 45% of the time. The method discards such an active node because no class has a significant majority and, therefore, it cannot claim the node as a representative point of any particular class. This phase of labeling active nodes ends once the class ratios (percentages) at every active node for all of the Kohonen nets are fairly stable and all active nodes (neurons) can either be assigned to classes or discarded if no class has a significant majority. The embodiment also discards active nodes that have comparatively low absolute count of patterns.

After assigning class labels to active nodes and dropping some of the active nodes, the method constructs lists of active nodes assigned to each class in each feature partition. For example, 50 active nodes may be assigned to class A in a particular feature partition and 20 active nodes assigned to class B and they constitute the representative training examples of the respective classes for this feature partition. Note that these active nodes can be from different Kohonen nets of different grid sizes, although in the same feature partition. Using these active nodes, the method computes the separability index of each feature in that feature partition and for each class.

3.5 Algorithm to Compute Separability Indices of Features for Feature Ranking by Class A summary of the overall steps of the online class-specific feature selection algorithm for streaming data using Kohonen nets follows, according to embodiments of the invention. Let $KN_{max}$ be the total number of Kohonen nets that are created in parallel. FG is the total number of different Kohonen net grid sizes used for each feature partition, and $FS=KN_{max}/FG$ is the number of feature partitions possible given the resources. For example, if the algorithm uses grid sizes 9×9, 8×8, 7×7, 6×6 and 5×5, then FG is 5. For $KN_{max}=500$, FS=500/5=100, which means it can create a maximum of 100 feature partitions. Let CC be the class count percentage of the most active class at an active node and let $PCT_{min}$ be the minimum class count percentage for a class to be assigned to an active node. In computational testing, $PCT_{min}$ is set to 70% across all problems. Let $CW_T$ be the cumulative weight change in a Kohonen net over the last T streaming patterns. Here T is the length of a streaming window to collect weight changes. Let $CW_T^{Max}$ be the maximum of the $CW_T$ since start of training of the Kohonen net. Let $CWR_T (=CW_T/CW_T^{Max})$ be the ratio of the current weight change to the maximum weight change. The method continues to train a Kohonen net until this ratio $CWR_T$ falls below a certain minimum level $CWR_T^{Min}$. In computational testing, $CWR_T^{Min}$ is set to 0.001. All notations are summarized in Table 3.1, below.

TABLE 3.1

Summary of notations used in online feature selection algorithm

| Symbol | Meaning |
|---|---|
| x | N-dimensional pattern vector, $x = (X_1, X_2, \ldots, X_N)$ |
| N | Size of pattern vector x |
| $X_n$ | $n^{th}$ element of the vector x |
| $KN_q^g$ | The $g^{th}$ Kohonen net of a certain grid size for the $q^{th}$ feature partition, $q = 1 \ldots FS$, $g = 1 \ldots FG$ |
| FS | Total number of feature partitions |
| FG | Total number of different Kohonen net grid sizes |
| kc | Total number of classes |
| k | Denotes a class in the set of classes $\{1, 2, \ldots, k, \ldots kc\}$ |
| $FP_q$ | $q^{th}$ feature partition, $q = 1 \ldots FS$ |
| $KN_{max}$ | total number of Kohonen nets that can be created in parallel |
| CC | the class count percentage of the most active class at an active node |
| $PCT_{min}$ | minimum required percentage of class counts for a class in order to assign an active node to that class |
| $CW_T$ | the cumulative weight change in a Kohonen net over the last T streaming patterns |
| T | the length of a window, in terms of number of streaming patterns, to collect weight changes |
| $CW_T^{Max}$ | the maximum of $CW_T$ since the start of training of a Kohonen net |
| $CWR_T$ | the ratio of the current weight change to the maximum weight change, $= CW_T/CW_T^{Max}$ |
| $CWR_T^{Min}$ | Minimum $CWR_T$ used as the stopping criterion. This is preset. Continue training a Kohonen net if $CWR_T > CWR_T^{Min}$ |

3.6 Algorithm for Class-Specific Feature Selection from Streaming Data Using Kohonen Nets Step 1. Process some streaming data to find the approximate maximum and minimum values of each feature. Use the range to normalize streaming input patterns during subsequent processing. The input vector x is assumed to be normalized in this algorithm. (Note: Other methods of data normalization can be also be used in this algorithm, according to embodiments of the invention.)

Step 2. Randomly partition the N features into FS subsets ($FS=KN_{max}/FG$) where each partition is denoted by $FP_q$, $q=1 \ldots FS$.

Step 3. Initialize the weights and learning parameters of the $KN_{max}$ Kohonen nets that will be trained in parallel, where FG is the number of Kohonen nets of different grid sizes for each feature partition $FP_q$, $q=1 \ldots FS$.

Step 4. Train all $KN_{max}$ Kohonen nets in parallel using streaming data and selecting appropriate parts of the input pattern vector for each Kohonen net according to the feature subset assigned to it. Stop training when all the Kohonen nets converge and their $CWR_T$ ratios are at or below $CWR_T^{Min}$.

Step 5. Process some more streaming data through the stabilized Kohonen nets, without changing the weights, to find the active nodes (winning neurons) and their class counts. Stop when class count percentages at all active nodes converge and are stable.

Step 6. Assign each active node (neuron) to a class if the class count percentage CC for the most active class at that node is $>=PCT_{min}$. Discard active neurons that do not satisfy the $PCT_{min}$ requirement or have a low total class count.

Step 7. Create a list of the remaining active nodes by class for each feature partition $FP_q$, $q=1 \ldots FS$.

Step 8. Compute the separability indices of the features separately for each feature partition $FP_q$, $q=1 \ldots FS$. Compute the separability indices of the particular features in a feature partition using the remaining active neurons for that feature partition only. Those remaining active neurons, which have been assigned to classes, are representative examples of the classes.

Step 9. Repeat steps 2 through 8 a few times, according to one embodiment, and track the maximum separability index value of each feature.

Step 10. Rank features on the basis of their maximum separability index value.

3.7 Discard all Kohonen Nets Built for Feature Selection

After class-specific ranking of features, embodiments of the invention train the final set of Kohonen nets for classification. At this point, the process discards all Kohonen nets built so far for feature ranking by class.

3.8 Example of Class-Specific Feature Selection

The method according to embodiments of the invention was tested on a number of high-dimensional gene expression problems. One such problem tries to predict the leukemia type (AML or ALL) from gene expression values (Golub et al. 1999). There are a total of 72 samples and 7129 genes (features) in this dataset. Table 3.2 shows a few of the genes and their separability indices by class. For example, genes 758, 1809 and 4680 have high separability indices for the AML class (82.53, 75.25 and 39.73 respectively) and are good predictors of the AML class. Comparatively, the corresponding separability indices of the same genes for the ALL class are quite low (2.49, 1.85 and 2.82 respectively) and, hence, these three genes are not very good predictors of the ALL class. Table 3.2 also shows three genes that are good predictors of the ALL class (2288, 760 and 6182) since they have high separability indices for the ALL class (114.75, 98.76 and 34.15). However, they are not good predictors of the AML class as shown by their low separability indices of 0.85, 0.93 and 0.8. This example illustrates the power of class-specific feature selection and its potential usefulness in understanding a particular phenomenon and in building classifiers.

TABLE 3.2

Separability indices for a few features in the AMLALL gene expression dataset

| | Separability Indices by Class | |
|---|---|---|
| Gene Number | AML | ALL |
| AML Good Features | | |
| 758 | 82.53 | 2.49 |
| 1809 | 75.25 | 1.85 |
| 4680 | 39.73 | 2.82 |
| ALL Good Features | | |
| 2288 | 0.85 | 114.75 |
| 760 | 0.93 | 98.76 |
| 6182 | 0.8 | 34.15 |

3.9 Feature Spaces to Explore and Build Classifiers for—Buckets of Features

According to embodiments of the invention, in the next phase, the method constructs classifiers exploiting the class-specific feature rankings produced in this phase. Section 4 presents a heuristic search procedure that explores different feature spaces to obtain a good classifier, according to embodiments of the invention. The procedure can be parallelized and such a version has been implemented on Apache Spark. This section explains the basic concept of buckets of features.

The separability index of a feature for a particular class measures the ability of that feature to create a separation between that class and the rest of the classes and also to make that particular class compact. And higher the value of the index, greater is the ability of the feature to separate that class from the rest of the classes. Thus, a feature that has an index value of 100 for a particular class is a much better and more powerful feature than another that has an index value of 2. Thus, in Table 3.2, the first three features—758, 1809 and 4680—are very good features for the AML class compared to the other three. And, similarly, the last three features—2288, 760, and 6182—are very good features for the ALL class compared to the other three.

A description follows of how the method, according to embodiments of the invention, explores different feature spaces given the class-specific feature rankings. In general, the process creates buckets of features and then trains several Kohonen nets of different grid sizes (e.g. 9×9, 8×8 and so on) for the feature spaces contained in the buckets. The most simplistic version of the procedure for creating buckets of features works as follows. For the first bucket, select the top ranked feature of each class. For the second bucket, select the top two ranked features of each class and similarly create other buckets. The procedure, therefore, sequentially adds top ranked features of each class to create the buckets. Thus, the $i^{th}$ bucket of features will have j top ranked features from each class.

With reference to the class-specific feature rankings of Table 3.2, to further illustrate the notion of bucket of features, suppose that the features (genes) 758, 1809 and 4680 are the three top ranked features of the AML class and the features 2288, 760 and 6182 the top three of the ALL class. In one embodiment of the invention, for bucket creation, features 758 (of the AML class) and 2288 (of the ALL class) will be in the first bucket of features. Features 758 and 1809 (of the AML class) and features 2288 and 760 (of the ALL class) will be in the second bucket, and so on. For this two-class problem, each bucket will have three feature spaces to explore. For the second bucket, for example, features 758 and 1809 of the AML class comprise one feature space. Features 2288 and 760 of the ALL class comprise the second feature space, and the third feature space consists of all four of these features.

For bucket two, for example, the method will train Kohonen nets of different grid sizes for three different feature spaces—(1) for the AML features 758 and 1809, (2) for the ALL features 2288 and 760, and (3) for the combined feature set consisting of the features 758, 1809, 2288 and 760. In general, for kc total classes, the $j^{th}$ bucket of features will have j top ranked features from each of the kc classes and the method will construct Kohonen nets of different grid sizes in parallel for each class using its corresponding j top ranked features, according to embodiments of the invention. The process will also train another set of Kohonen nets for the $j^{th}$ bucket using all kc*j features in the bucket. A bucket, therefore, consists of a variety of feature spaces and the method trains a variety of Kohonen nets for each such feature space.

When there are thousands of features, the incremental addition of one feature per class to the next bucket and training several Kohonen nets for each bucket can become a computationally expensive procedure even when parallelized. So, instead, according to one embodiment, the method adds more than one feature at a time to the next bucket to reduce the computational work. The other issue is how to limit the total number of buckets to explore. To address that issue, the method ignores features with separability indices lower than 1, according to an embodiment. The assumption is that features with indices less than 1 are poor discriminators for the class. With the remaining features, the process uses increments of more than one and it generally adds two or more features at a time to the next bucket from the ranked list. For example, given two classes A and B, and after class-specific feature ranking, suppose the method selects 50 top-ranked features from each class to build classifiers. If the process adds two features at a time from each class to the buckets, there will be 25 total buckets. The first bucket will have 4 features, 2 from each class, and the last bucket will have all 100 features, 50 from each class. However, each bucket will always have three feature spaces—one for class A features, one for class B features, and the third for the combined set of features. And the method will construct Kohonen nets of different grid sizes for each of the three feature spaces in each bucket, according to embodiments of the invention.

4. CONSTRUCTING ENSEMBLE OF HYPERSPHERE CLASSIFIERS WITH KOHONEN NEURONS

The following describes how the method creates an ensemble of hypersphere nets using Kohonen neurons, according to embodiments of the invention. The method does this by selecting Kohonen neurons from various Kohonen nets in different feature spaces and of different grid sizes. Note that, at the end of this final phase, the method discards all of the trained Kohonen nets and retains only a selected set of Kohonen neurons to serve as hyperspheres in different hypersphere nets.

4.1 Train Final Kohonen Nets for Different Feature Spaces in Different Buckets—Assign Neurons (Active Nodes) to Classes on a Majority Basis In this phase, the method trains a final set of Kohonen nets using streaming data. The method constructs Kohonen nets of different grid sizes (e.g. 9×9, 8×8 and so on) for different feature spaces in different buckets. The method constructs all of these Kohonen nets in parallel and selects appropriate parts of the input vector for each feature space in each bucket. Once these Kohonen nets converge and stabilize, the method processes some more streaming data, without changing the weights of the Kohonen nets, to get the class count percentages at each active node. This step is identical to the one in the feature selection phase. After the class count percentages stabilize at each of the active nodes, the process does some pruning of the active nodes. This step, again, is similar to the one in the feature selection phase. Thus, active nodes with small total class counts are discarded and only the nodes where one class has a clear majority (e.g. 70% majority) are retained. In a sense, the process selects the good neurons where a particular class has a clear majority.

4.2 Computing Radius of a Kohonen Neuron—Each Kohonen Neuron is a Hypersphere

Let the radius of an active node (neuron) be the distance from the center of the class within which it is the winning neuron. This concept is important to the method because it only retains a few active nodes from a Kohonen net and discards the rest of the network. Once the method discards the rest of the Kohonen net, there is no feasible way to determine the winning or best neuron for a class in an input pattern. In absence of the Kohonen net, the radius becomes the substitute way to determine if an active node is the winning node for a class. The method creates hyperspheres by extracting these neurons from the Kohonen nets.

To determine the radii of the active nodes of a Kohonen net, the process initializes the radii of these active nodes to zero and then updates them by processing some more streaming data until the radii are stable for all active nodes. The method updates the radius of an active node in the following way: if the streaming input pattern has the same class as the class of the winning active node, the method computes the distance of the input pattern from the node and updates the radius of the node if the distance is greater than the current radius. Note that before the process computes the radius, classes are assigned to these active nodes. So the process matches the class of the winning active node with that of the input pattern before updating the radius of the active node. The process updates the radii of all active nodes that are assigned to classes before discarding the Kohonen nets.

4.3 Further Notations and Computation of Parameters

Let $B_{max}$ be the maximum number of feature buckets. The method computes $B_{max}$ based on the resources available. As before, suppose there are resources to create $KN_{max}$ number of Kohonen nets in parallel. And, as before, let FG be the number of Kohonen nets of different grid sizes (e.g. 9×9, 8×8 and so on) trained for a feature space. For kc total classes, the maximum number of feature buckets will therefore be $B_{max}=KN_{max}/(FG*(kc+1))$. For example, suppose Apache Spark, in a particular configuration, can only create 300 Kohonen nets in parallel ($KN_{max}=300$), and suppose the method uses standard grid sizes 9×9, 8×8, 7×7, 6×6 and 5×5 (FG=5) for the Kohonen nets. If there are 2 classes (kc=2), $B_{max}=300/(5*3)=20$. This means that the method can only use 20 feature buckets due to resource constraints. Suppose that, after class-specific feature ranking, the method selects 60 top-ranked features from each class to build classifiers. Since the process can only use 20 feature buckets, it is, therefore, forced to add 3 features at a time to the buckets from each class. Thus, the first bucket will have 6 features, 3 from each class, and the last bucket will have all 120 features, 60 from each class. And each bucket will always have three feature spaces—one for each class and the third for the combined set of features. And there will be FG Kohonen nets of different grid sizes for each of the three feature spaces in each bucket.

Let Inc be the number of features added each time to a bucket for each class. Inc is calculated from the number of top-ranked features to use from each class and $B_{max}$. Let $FB_j$ be the $j^{th}$ bucket of features, $j=1 \ldots B_{max}$. Let $FSB_{kj}$ represent the set of features belonging to class k in bucket number j. Let $AN_{kj}$ be the list of active nodes across all FG grid sizes for class k feature set $FSB_{kj}$ for bucket j, $k=1 \ldots kc, j=1 \ldots B_{max}$. Let $AN_{kji}$ be the $i^{th}$ active node for class k feature set $FSB_{kj}$, $i=1 \ldots ANT_{kj}$, where $ANT_{kj}$ is the total number of such active nodes for class k feature set $FSB_{kj}$. Note that although the active nodes $AN_{kj}$ resulted from Kohonen nets built with the class k feature set in bucket j, these active nodes could belong to (that is, be assigned to) any of the classes k, $k=1 \ldots kc$. Let $W_{kji}$ be the width or radius of the $i^{th}$ active node $AN_{kji}$. Let $CTP_{kjjm}$, $m=1 \ldots kc$, be the class count percentage of the $m^{th}$ class at active node $AN_{kji}$ and let $CTA_{kji}$ be the absolute count of input patterns processed at that active node. All notations are summarized in Table 4.1, below.

TABLE 4.1

Summary of notations used in online Kohonen ensemble algorithm

| Symbol | Meaning |
| --- | --- |
| x | The N-dimensional pattern vector, $x = (X_1, X_2, \ldots, X_N)$ |
| N | Size of the pattern vector x |
| $X_n$ | $n^{th}$ element of the vector x |
| FG | Number of Kohonen nets of different grid sizes trained for a feature space |
| kc | Total number of classes |
| k | Denotes a class in the set of classes $\{1, 2, \ldots, k, \ldots kc\}$ |
| $KN_{max}$ | total number of Kohonen nets that can be created in parallel |
| $PCT_{min}$ | minimum required percentage of class counts for a class in order to assign an active node to that class |
| $CT_{min}$ | minimum required absolute class count for a class in order to assign an active node to that class |
| $CW_T$ | the cumulative weight change in a Kohonen net over the last T streaming patterns |
| $CW_T^{Max}$ | the maximum of $CW_T$ since the start of training of a Kohonen net |
| $CWR_T$ | the ratio of the current weight change to the maximum weight change, $= CW_T/CW_T^{Max}$ |
| $CWR_T^{Min}$ | continue training a Kohonen net if $CWR_T > CWR_T^{Min}$; this is the convergence criterion |
| $FB_j$ | the $j^{th}$ bucket of features, $j = 1 \ldots B_{max}$ |
| $B_{max}$ | the maximum number of feature buckets allowed |
| Inc | the number of features from each class added to a bucket each time |
| $FSB_{kj}$ | the set of features selected for class k in bucket j, $k = 1 \ldots kc$, $j = 1 \ldots B_{max}$ |
| $AN_{kj}$ | the list of active nodes across all FG grid sizes for class k feature set $FSB_{kj}$ |
| $ANT_{kj}$ | total number of active nodes for class k feature set $FSB_{kj}$ |
| $AN_{kji}$ | the $i^{th}$ active node for class k feature set $FSB_{kj}$, $i = 1 \ldots ANT_{kj}$ |
| $W_{kji}$ | width or radius of the $i^{th}$ active node $AN_{kji}$ |
| $CTP_{kjjm}$ | the class count percentage of the $m^{th}$ class at active node $AN_{kji}$, $m = 1 \ldots kc$ |
| $CTA_{kji}$ | the absolute count of input patterns processed at active node $AN_{kji}$ |

4.4 Algorithm to Train the Final Set of Kohonen Nets for Classification

Step 1. Initialize bucket number j to zero.

Step 2. Increment bucket number j (j=j+1) and add (Inc*j) number of top ranked features to bucket $FB_j$ from the ranked feature list of each class k (k=1 \ldots kc). $FSB_{kj}$ is the set of (Inc*j) top ranked features of class k in bucket j.

Step 3. Initialize final Kohonen nets, in parallel in a distributed computing system, of FG different grid sizes for each class k (k=1 \ldots kc) and for the corresponding feature set $FSB_{kj}$. Also initialize FG Kohonen nets for a feature set that includes all of the features from all classes in bucket j. If j<$B_{max}$, go back to step 2 to set up other Kohonen nets for other feature buckets. When j=$B_{max}$, go to step 4.

Step 4. Train all $KN_{max}$ Kohonen nets in parallel using streaming data and selecting appropriate parts of the input pattern for each Kohonen net according to the feature subsets $FSB_{kj}$, k=1 \ldots kc, j=1 \ldots $B_{max}$. Stop training when all Kohonen nets converge, that is, when $CWR_T<=CWR_T^{Min}$ for all Kohonen nets.

Step 5. Process some more streaming data through the stabilized Kohonen nets, without changing the weights, to find the set $AN_{kj}$ of active nodes (neurons) in the corresponding Kohonen nets for each class k in each bucket j (k=1 \ldots kc, j=1 \ldots $B_{max}$). Also find the set of active nodes for the Kohonen net that uses all features of all classes in bucket j, j=1 \ldots $B_{max}$. In addition, get the class counts $CTA_{kji}$ of the active nodes and stop when the class count percentages $CTP_{kjjm}$, m=1 \ldots kc, become stable for all active nodes.

Step 6. Assign each active node $AN_{kji}$ to the majority class m if the class count percentage $CTP_{kjjm}$, m=1 \ldots kc, for the majority class m at that active node is above the minimum threshold $PCT_{min}$ and the absolute class count $CTA_{kji}$ is above the threshold $CT_{min}$.

Step 7. Process some more streaming data to compute the radius $W_{kji}$ of each active node $AN_{kji}$. Stop when the radii or widths become stable.

Step 8. Retain only the active nodes $AN_{kj}$, k=1 . . . kc, j=1 . . . $B_{max}$, from the corresponding Kohonen nets that satisfy the minimum thresholds $PCT_{min}$ and $CT_{min}$. Also retain the active nodes from the Kohonen nets based on all features of all classes in bucket j, j=1 . . . $B_{max}$, and who satisfy the minimum thresholds. Discard all other nodes from all of the $KN_{max}$ Kohonen nets.

This algorithm produces a set of active Kohonen neurons for each bucket j, j=1 . . . $B_{max}$, and each Kohonen neuron is assigned to a specific class. The process then tests the ensemble of Kohonen neurons in each bucket with validation data sets to find out which bucket (or buckets) of features produces the best classifier.

5. AN ENSEMBLE CLASSIFIER BASED ON AN ENSEMBLE OF KOHONEN NEURONS

The algorithm of section 4.4 essentially creates an ensemble of hypersphere nets—one hypersphere net for each of the distinct feature spaces corresponding to a particular class k and a particular bucket j, plus one combining all of the features in bucket j. A hypersphere net consists of one hidden layer and one output layer as shown in FIG. 1. Each hidden node in a hypersphere net represents one of the hyperspheres. The design and training of a hypersphere net consists of 1) determining the hyperspheres to use for each class k, and 2) finding their centers and widths or radii. In this method, each active Kohonen neuron, determined through the algorithm of section 4.4 and assigned to a class, is a hypersphere in a hypersphere net. So, the method essentially creates an ensemble of hypersphere nets by means of Kohonen nets.

5.1 Computations at a Single Hidden Node of a Hypersphere Net

Suppose $p_k$ hyperspheres cover the region of a certain class k, k=1 . . . kc. The class region, therefore, is the union of all the hypersphere regions representing class k. Generally, the output of a hidden node is one when the input vector is within the region of the hypersphere and zero otherwise. Mathematically, the functional form of a hypersphere-hidden node is as follows:

$$f_q^k(x) = 1 \text{ if } z_q^k(x) \geq \varepsilon_q^k, \qquad (5.1)$$
$$= 0 \text{ otherwise,}$$

where $z_q^k(x) = w_q^k - d_q^k(x)$ (5.2)

$$d_q^k(x) = \left(\sum_{n=1}^{nv} (c_{qn}^k - X_n)^2\right)^{1/2} \qquad (5.3)$$

Here $f_q^k(x)$ is the response function of the $q^{th}$ hidden node for class k, q=1 . . . $p_k$. $c_q^k=(c_{q1}^k \ldots c_{qnv}^k)$ and $w_q^k$ are the center and width (radius) of the $q^{th}$ hypersphere for class k, nv is the number of features in that particular feature space, $d_q^k(x)$ is the distance of the input vector x from the center $c_q^k$ of the $q^{th}$ hidden node, $z_q^k(x)$ is the difference between the width (radius) $w_q^k$ and the distance $d_q^k(x)$, and $\varepsilon_q^k$ is a small constant. $\varepsilon_q^k$ can be slightly negative to allow an input pattern x to belong to class k if it is close enough to one of the hyperspheres of class k. Let $p_q^k(x)$ be a measure of the probability of an input vector x being a member of (i.e. being inside the boundary of) the $q^{th}$ hypersphere for class k, q=1 . . . $p_k$.

$$p_q^k(x) = (w_q^k - d_q^k(x))/w_q^k \qquad (5.4)$$

If an input vector x is at the boundary of the $q^{th}$ hypersphere, $d_q^k(x) = w_q^k$ and, therefore, $p_q^k(x) = 0$. If it's at the center of the hypersphere, $d_q^k(x) = 0$ and $p_q^k(x) = 1$. If an input vector x is outside the boundary of the $q^{th}$ hypersphere, $d_q^k(x) > w_q^k$ and $p_q^k(x)$ is negative.

Let $dn_q^k(x)$ be the normalized distance and defined as follows:

$$dn_q^k(x) = d_q^k(x)/nv, \qquad (5.5)$$

where nv is the number of features in that particular feature space.

5.2 Ensemble Classifiers

In general, combining multiple classifiers can improve overall performance on a problem. One can categorize such ensemble methods in many different ways. One can combine base classifiers in a variety of ways for final prediction. Some popular ones include majority voting (selects the class with highest number of votes), performance weighting of base classifiers (weight the classifiers based on their accuracy), distribution summation (summation of the conditional probability vector from the base classifiers), mathematical programming and many others. As explained in the next section, the method, according to embodiments of the invention, uses different variations of these combining methods on the ensemble of hypersphere classifiers.

5.3 Using Ensemble of Kohonen Neurons in Different Feature Spaces for Classification In embodiments of the invention, all hyperspheres (i.e. all active Kohonen neurons assigned to classes) are considered as being part of a composite classifier although, within that framework, each hypersphere is treated as an independent predictor. And, along with standard ensemble prediction schemes such as maximum probability and minimum distance, a particular voting mechanism is used that has worked well. In general, one can try different methods of combining classifier predictions and find the best method for a particular problem. Embodiments of the invention use the following measures to determine the final classification of a test example.

a. Maximum Probability—in this embodiment, the method finds the hypersphere (i.e. an active Kohonen neuron) with the highest probability (or confidence) using the probability estimate $p_q^k(x)$ of (5.4) and assign its class to the test example. Points outside the boundary of a hypersphere have a negative probability $p_q^k(x)$ and negative probabilities are allowed up to a limit. The maximum probability, therefore, can be negative. The computational testing procedure used a limit of −0.5 for probability.

b. Minimum Distance—according to this embodiment, the method finds the hypersphere (i.e. an active Kohonen neuron) whose center is closest to the test example based on the normalized distance $dn_q^k(x)$ of (5.5) and assign its class to the test example.

c. Inside neuron majority voting—according to this embodiment, the method first determines if the test example is within the boundary of a hypersphere or not based on the normalized distance $dn_q^k(x)$ and, if it is, it counts it as a vote for the class represented by that hypersphere. After testing against all of the hyperspheres (i.e. all active Kohonen neurons), the embodiment counts the votes for each class and the majority class wins, and then assigns the majority class to the test example.

d. Majority voting with test points allowed to be outside the hyperspheres—In many problems, some test examples may be outside the boundary of a hypersphere, but otherwise close to that hypersphere. In such case, the method allows test examples that are close to a hypersphere to vote for the class represented by that hypersphere. However, the method sets a limit on how far outside the hypersphere a test point can be. According to one embodiment, the method uses the probability measure $p^k_q(x)$ instead of the normalized distance measure $dn^k_q(x)$. One can test with various limits on a given problem and find out which limit produces the best accuracy. The computational testing procedure used two limits—−0.25 and −0.35, but other limits can be tried.

6. COMPUTATIONAL RESULTS 6.1 Datasets

Gene expression problems are characterized by high dimensionality (the number of features or genes are usually a few thousand) and a small number of training examples (typically just a few dozen). Computational testing of the algorithm according to embodiments of the invention was performed on seven widely referenced gene expression datasets. These datasets are briefly described below.

a) Leukemia (AML vs. ALL): The leukemia dataset was published by Golub et al. (1999) and the original training data consists of 38 bone marrow samples (27 ALL and 11 AML, where AML and ALL are the two types of leukemia) and 7129 genes. It also has 34 test samples with 20 ALL and 14 AML.

b) Central Nervous System (CNS): The CNS dataset is from Pomeroy et al. (2002) and is about creating gene expression profiles of patients who survive a certain treatment for Embryonal tumors of the central nervous system versus those that don't. The dataset contains 60 patient samples with 7129 genes where 21 are survivors and 39 are failures.

c) Colon Tumor: The two-class gene expression data for adult colon cancer is from Alon et al. (1999) and it contains 62 samples based on expression of 2000 genes and they include 40 tumor biopsies ("negative") and 22 normal biopsies ("positive") from the same patients.

d) SRBCT: The four-class gene expression data for diagnosing small round blue-cell tumors (SRBCT) is from Khan et al. (2001). The dataset contains 63 samples of these four different types of tumors and has expression values for 2308 genes.

e) Lymphoma: The three-class gene expression data for non-Hodgkin's lymphoma is from Alizadeh et al. (2000). The dataset contains 62 samples of three different subtypes of lymphoma and has expression values for 4026 genes.

f) Prostate: The data here consists of 102 prostate tissues from patients undergoing surgery of which 50 are normal and 52 tumor samples (Singh et al. 2002). It has expression values for 6033 genes.

g) Brain: This dataset, also from Pomeroy et al. (2002), contains microarray expression data for 42 brain cancer samples for 5 different tumor subtypes. It has expression values for 5597 genes.

Table 6.1 summarizes the main characteristics of these datasets. For all of these problems, the original training and test data was combined and then random sub-sampling used to generate the training and testing sets (Stone 1974). The training and test sets from the available data were randomly generated by randomly selecting nine-tenths of it for training and using the remainder for testing. This random allocation was repeated 50 times for each dataset and this section reports the average results of the 50 runs. The implementation for these fixed datasets simulated online learning by reading one input pattern at a time.

TABLE 6.1

Characteristics of the gene expression problems

|  | No. of genes | No. of classes | No. of examples |
|---|---|---|---|
| Leukemia (AML-ALL) | 7129 | 2 | 72 |
| Central Nervous System | 7129 | 2 | 60 |
| Colon Tumor | 2000 | 2 | 62 |
| SRBCT | 2308 | 4 | 63 |
| Lymphoma | 4026 | 3 | 62 |
| Prostate | 6033 | 2 | 102 |
| Brain | 5597 | 5 | 42 |

6.2 Parameter Settings

There was no fine-tuning of parameters for any of the problems solved with this method. For this set of problems, the parameters were set as follows. For Kohonen nets, the grid sizes used were 9×9, 8×8, 7×7, 6×6, 5×5, 4×4 and 3×3(FG=7). The thresholds $PCT_{min}$ and $CT_{min}$ were set to 70% and 3 respectively. $CWR_T^{Min}$ was set to 0.001.

6.3 Experimental Results—Feature Selection

Table 6.2 shows the average number of features used by this method for the gene expression problems. For these problems, an important challenge is to discover a small set of genes (features) responsible for a disease (or successful treatment) so that they can be further investigated for a better understanding of the disease (or treatment) (Kim et al. 2002). Identifying a small set of genes for disease type diagnosis and treatment also reduces the cost of clinical tests. As shown in Table 6.2, the method is fairly good at identifying a small set of genes (features) among the thousands.

TABLE 6.2

Average number of features used by the Kohonen neuron ensemble method for the gene expression problems.

|  | Total no. of attributes | Average No. of features used in ensemble of Kohonen neurons | % of features used on average in ensemble of Kohonen neurons |
|---|---|---|---|
| Leukemia (AML-ALL) | 7129 | 16 | 0.22% |
| Central Nervous System | 7129 | 4 | 0.06% |
| Colon Tumor | 2000 | 39 | 1.95% |
| SRBCT | 2308 | 10 | 0.43% |
| Lymphoma | 4026 | 39 | 0.97% |
| Prostate | 6033 | 40 | 0.66% |
| Brain | 5597 | 115 | 2.06% |

6.4 Experimental Evaluation of the Kohonen Neuron Ensemble Classifier System

This section of the description presents the experimental results for the Kohonen ensemble algorithm that consists of (1) class-specific feature selection, and (2) training an ensemble of Kohonen neurons for classification using the selected features. The section compares the performance of the algorithm with other, prior-art feature selection and classification algorithms and uses results from Bu et al. (2007), Li et al. (2007) and Dettling (2004) for the comparison. These gene expression problems were also solved with Apache Spark's machine learning library MLlib (Apache Spark MLlib 2015) for comparison.

Bu et al. (2007) provides experimental results on several gene expression problems. They used PCA for dimension reduction, genetic algorithm (GA) and backward floating search method (BFS) for feature selection, and support vector machines (SVM) for classification. For their tests, they randomly split the data into ⅔ for training and the rest for testing and repeated the procedure 50 times. Table 6.3 shows the average error rates and standard deviations for the various combinations of feature extraction, feature selection and SVM. Table 6.3 also shows the results for the Kohonen neuron ensemble algorithm.

Compared to that, the Kohonen ensemble algorithm uses far less genes, has better interpretability and it would cost far less to perform the gene tests.

Dettling (2004) provides experimental results for a variety of algorithms for most of these gene expression problems and Table 6.6 shows the average error rates. For his tests, he randomly split the data into ⅔ for training and the rest for testing and repeated the procedure 50 times. However, he selected balanced training sets and that may have provided better results for some algorithms. Note that the Kohonen ensemble algorithm didn't use balanced training sets for testing. Dettling (2004) provides confidence levels for the error rates in a graphical form, but they are hard to decipher. Table 6.6, therefore, does not show standard deviations of the error rates other than for the Kohonen ensemble method.

TABLE 6.3

Average test error rates and standard deviations for various classification algorithms for the gene expression datasets. SVM results are from Bu et al. (2007).

|  | Kohonen ensemble | SVM | PCA + SVM | PCA + BFS + SVM | PCA + GA + SVM |
|---|---|---|---|---|---|
| Leukemia (AML-ALL) | 0.57 (2.83) | 8.13 (4.87) | 6.83 (5.34) | 6.43 (5.32) | 4.17 (2.1) |
| Central Nervous System | 29.67 (9.26) | 43.67 (7.07) | 42.46 (4.45) | 39.83 (5.5) | 40.69 (6.16) |
| Colon Tumor | 11.33 (11.88) | 31.75 (6.91) | 29.83 (6.22) | 24.4 (4.63) | 23.61 (3.42) |

Li et al. (2007) developed a method that combines preliminary feature selection with partial least squares for dimension reduction (PLSDR) (Dai et al. 2006) for these gene expression problems. They used a linear SVM and a KNN method, with K=1 for classification. They used stratified 10-fold cross validation and Table 6.4 shows the average error rates and standard deviations for the two classifiers along with Kohonen ensemble results. Note that all reported SVM results, both in Bu et al. (2007) and Li et al. (2007), are after fine-tuning of parameters for each individual problem, whereas the Kohonen ensemble algorithm used no such fine tuning. Overall, the Kohonen ensemble algorithm performs well on these different gene expression problems when compared against the various variations of SVM and feature selection/extraction algorithms.

Table 6.5 compares the average number of features used in the Kohonen ensemble algorithm with those used by the Gene Selection+PLSDR method of Li et al. (2007). In the Gene Selection+PLSDR method, genes are first eliminated based on a t-statistic score. So Table 6.5 shows how many genes were used on average for dimensionality reduction by PLSDR after the elimination step. In discussing these results, Li et al. (2007) notes: "*The proposed method can greatly reduce the dimensionality, averagely fifty percent genes were reduced from the full set.*" Note that about fifty percent of the original set of genes is still used in PLSDR dimensionality reduction and, therefore, interpretability of results and the cost of gene tests are still a problem.

TABLE 6.4

Average test error rates and standard deviations for various classification algorithms for the gene expression datasets. PLSDR results are from Li et al. (2007)

|  | Kohonen ensemble | PLSDR + SVM | PLSDR + kNN |
|---|---|---|---|
| Leukemia (AML-ALL) | 0.57 (2.83) | 2.82 (0.0) | 2.37 (0.01) |
| Central Nervous System | 29.67 (9.26) | 31.5 (0.04) | 35.0 (0.02) |
| Colon Tumor | 11.33 (11.88) | 16.45 (0.03) | 24.31 (0.03) |

TABLE 6.5

Average number of features used in the Kohonen ensemble algorithm and the Gene Selection + PLSDR method of Li et al. (2007)

|  | Kohonen ensemble | Gene Selection + PLSDR |
|---|---|---|
| Leukemia (AML-ALL) | 16 | 3966.80 |
| Central Nervous System | 4 | 3109.34 |
| Colon Tumor | 39 | 1141.39 |

TABLE 6.6

Average test error rates for various classification algorithms from Dettling (2004)

| | Kohonen ensemble | BagBoost | Random Forest | SVM | kNN | DLDA | Boosting | Bagging | CART |
|---|---|---|---|---|---|---|---|---|---|
| Leukemia (AML-ALL) | 0.57 (2.83) | 4.08 | 2.5 | 3.5 | 3.83 | 2.92 | 5.67 | 7.17 | 13.42 |
| Colon Tumor | 11.33 (11.88) | 16.10 | 15.43 | 16.67 | 16.38 | 12.86 | 19.14 | 16.86 | 25.52 |
| SRBCT | 1.11 (3.51) | 1.24 | 2.29 | 1.81 | 1.43 | 2.19 | 6.19 | 19.33 | 24.38 |
| Lymphoma | 1.11 (3.51) | 1.62 | 1.43 | 0.95 | 1.52 | 2.19 | 6.29 | 20.57 | 20.48 |
| Prostate | 6.0 (8.43) | 7.53 | 7.88 | 6.82 | 10.59 | 14.18 | 8.71 | 8.94 | 12.59 |
| Brain | 24.0 (8.3) | 23.86 | 34.71 | 28.14 | 29.71 | 28.57 | 27.57 | 49.0 | 51.29 |

Apache Spark Machine Learning Library (MLlib) Comparisons

Table 6.7 shows the average error rates and standard deviations for a variety of algorithms in the Apache Spark Machine Learning Library MLlib (2015). SVMwithSGD (the SVM method) and LogRegWithSGD (the logistic regression method) use the stochastic gradient descent (SGD) method to train the classifiers. All these algorithms were used with their default parameters. SVMwithSGD and LogRegWithSGD only work for two class problems, hence they don't have results in the table for the multiclass problems SRBCT, Lymphoma and Brain. For these Spark MLlib tests, the data was randomly split into ⅔ for training and the rest for testing and the procedure repeated 50 times.

TABLE 6.7

Average test error rates and standard deviations for various classification algorithms of Apache Spark Machine Learning Library MLlib (2015)

| | Kohonen ensemble | SVMwithSGD | NaiveBayes | LogRegWithSGD | RandomForest |
|---|---|---|---|---|---|
| Leukemia (AML-ALL) | 0.57 (2.83) | 4.4 (7.0) | 10.26 (8.0) | 10.29 (12) | 12.8 (10) |
| Central Nervous System | 29.67 (9.26) | 33.25 (14) | 42.84 (11) | 36.25 (13) | 41.26 (11) |
| Colon Tumor | 11.33 (11.88) | 17.56 (11) | 8.33 (12) | 12 (12) | 18.67 (12) |
| SRBCT | 1.11 (3.51) | — | 7.33 (12) | — | 21.33 (18) |
| Lymphoma | 1.11 (3.51) | — | 1.9 (3) | — | 5.67 (10) |
| Prostate | 6.0 (8.43) | 13.64 (5) | 36.97 (12) | 13.4 (10) | 19.6 (13) |
| Brain | 24.0 (8.3) | — | 18 (19) | — | 47.5 (25) |

7. ADDITIONAL EMBODIMENTS FOR HANDLING IMBALANCED DATA PROBLEMS

7.1 Introduction

Many real-life classification problems, both for streaming and stored big data, are highly imbalanced and it is fairly difficult for standard classification methods to accurately predict the minority class.

Embodiments of the invention use a classification method for imbalanced streaming data based on the algorithm presented in section 4.4 for balanced streaming data. The method uses a two-layered ensemble of hypersphere nets to discover the minority class. The following description explains the basic ideas behind the method with an example, presents the algorithm and some preliminary computational results.

7.2 Two-Layered Hypersphere Nets

A Kohonen net, as shown in FIG. 3, is generally used for clustering data into separate classes of patterns in a data stream. For classification problems, once it finds clusters, one can then label the nodes based on the majority class at that node and use it as a prediction system. That is the essence of the method presented so far, according to embodiments of the invention. However, for imbalanced data problems, where very few data points exist for one or more classes, but lots of data points are available for the other classes, the minority class may not be in the majority at any of the nodes in the net or in only a few nodes. As a result, none or just a few of the nodes in the net will predict the minority class. To address this problem, one embodiment identifies Kohonen nodes with a significant presence of the minority class and then uses the training data points at those nodes to train another set of Kohonen nets. The basic idea is to break up the data points at those nodes to find the minority class regions. Henceforth, the Kohonen nets for the individual nodes with significant minority class presence are often referred to as Kohonen submodels or subnets. The next section explains the process of finding the minority class regions with a second layer of Kohonen nets.

7.3 The Process of Finding Minority Class Regions

The adult census dataset (Kohavi 1996) is widely used to compare classification algorithms. The dataset has demographic information about US citizens and the classification problem is to predict who earns more than $50K vs. less than $50K. It has 16,281 examples in the training set of which 12,435 examples correspond to the <=50K class and 3846 examples correspond to the >50K class. Thus the >50K class has only about 23.62% of the data points and is considered a minority class for purposes of this discussion. A Kohonen net of grid size 5×5 trained on this data produces 25 active nodes. A trained Kohonen net of grid size 7×7 has 44 active nodes. Table 7.1 shows the distribution of data among the various nodes of both the Kohonen nets—5×5 and 7×7. The columns "<=50K Count" and ">50K Count" show the number of data points at each node belonging to the <=50K and >50K classes respectively. So, for example, in the 5×5 grid, the first row is for the node X=0, Y=0 and has 1044 data points from the <=50K class and 980 points from the >50K class. Suppose that a node that has more than 10% of the data points or at least 50 data points from the >50K class is considered to have a significant presence of the minority class. And suppose that the remaining nodes belong to the majority class <=50K because the majority class is dominant. With node classification on this basis, the 5×5 grid has 12 nodes where the majority class has absolute dominance and they contain a total of 3418 or 27.5% of the 12435 majority class data points. And these 12 majority class nodes contain just 65 or 1.7% of the 3846 minority class data points. Compared to that, the 7×7 grid has 27 nodes where the majority class has absolute dominance and they contain a total of 5847 or 47% of the 12435 majority class data points. And these 27 majority class nodes contain just 228 or 6% of the 3846 minority class data points. Thus, the 7×7 grid successfully separates more of the majority class data points from the minority class compared to the 5×5 grid—5847 vs. 3418. With a 25×25 grid, there is much more separation between the classes. With a 25×25 grid, there are 368 nodes where the majority class has absolute dominance and they contain a total of 8591 or 69% of the total 12435 majority class data points. And these 368 majority class nodes contain just 210 or 5.5% of the 3846 minority class data points. So, compared to 5×5 and 7×7 grids, the 25×25 grid does a far better job of separating the two classes. Table 7.2 presents a summary of these numbers.

TABLE 7.1

Distribution of data across Kohonen nets of grid sizes 5 × 5 and 7 × 7

| Kohonen net - 5 × 5 Grid | | | | Kohonen net - 7 × 7 Grid | | | |
| --- | --- | --- | --- | --- | --- | --- | --- |
| Kohonen Node Coordinate | <=50K Count | >50K Count | Total | Kohonen node Coordinate | <=50K Count | >50K Count | Total |
| X = 0, Y = 0 | 1044 | 980 | 2024 | X = 0, Y = 0 | 691 | 152 | 843 |
| X = 0, Y = 1 | 40 | 61 | 101 | X = 0, Y = 1 | 258 | 25 | 283 |
| X = 0, Y = 2 | 917 | 1268 | 2185 | X = 0, Y = 2 | 387 | 7 | 394 |
| X = 0, Y = 3 | 435 | 96 | 531 | X = 0, Y = 3 | 338 | 7 | 345 |
| X = 0, Y = 4 | 995 | 475 | 1470 | X = 0, Y = 4 | 568 | 10 | 578 |
| X = 1, Y = 0 | 185 | 51 | 236 | X = 0, Y = 5 | 415 | 9 | 424 |
| X = 1, Y = 1 | 3 | 1 | 4 | X = 0, Y = 6 | 625 | 5 | 630 |
| X = 1, Y = 2 | 14 | 3 | 17 | X = 1, Y = 0 | 201 | 10 | 211 |
| X = 1, Y = 3 | 9 | | 9 | X = 1, Y = 1 | 52 | 10 | 62 |
| X = 1, Y = 4 | 59 | 1 | 60 | X = 1, Y = 2 | 163 | 3 | 166 |
| X = 2, Y = 0 | 627 | 7 | 634 | X = 1, Y = 3 | 25 | 1 | 26 |
| X = 2, Y = 1 | 55 | 19 | 74 | X = 1, Y = 4 | 74 | 4 | 78 |
| X = 2, Y = 2 | 419 | 340 | 759 | X = 1, Y = 5 | 30 | | 30 |
| X = 2, Y = 3 | 16 | 2 | 18 | X = 1, Y = 6 | 29 | 1 | 30 |
| X = 2, Y = 4 | 2097 | 200 | 2297 | X = 2, Y = 0 | 585 | 29 | 614 |
| X = 3, Y = 0 | 307 | 8 | 315 | X = 2, Y = 1 | 138 | 2 | 140 |
| X = 3, Y = 1 | 105 | 4 | 109 | X = 2, Y = 2 | 620 | 17 | 637 |
| X = 3, Y = 2 | 63 | 1 | 64 | X = 2, Y = 3 | 101 | 1 | 102 |
| X = 3, Y = 3 | 92 | 11 | 103 | X = 2, Y = 4 | 588 | 19 | 607 |
| X = 3, Y = 4 | 126 | 32 | 158 | X = 2, Y = 6 | 982 | 475 | 1457 |
| X = 4, Y = 0 | 1718 | 23 | 1741 | X = 3, Y = 0 | 358 | 34 | 392 |
| X = 4, Y = 1 | 404 | 5 | 409 | X = 3, Y = 1 | 22 | 2 | 24 |
| X = 4, Y = 2 | 1313 | 78 | 1391 | X = 3, Y = 2 | 67 | 15 | 82 |
| X = 4, Y = 3 | 93 | 10 | 103 | X = 3, Y = 3 | 14 | 2 | 16 |
| X = 4, Y = 4 | 1299 | 170 | 1469 | X = 3, Y = 4 | 191 | 52 | 243 |
| | | | | X = 4, Y = 0 | 839 | 122 | 961 |
| | | | | X = 4, Y = 1 | 61 | 9 | 70 |
| | | | | X = 4, Y = 2 | 344 | 320 | 664 |
| | | | | X = 4, Y = 3 | 18 | 3 | 21 |
| | | | | X = 4, Y = 4 | 438 | 186 | 624 |
| | | | | X = 4, Y = 5 | 11 | 1 | 12 |
| | | | | X = 4, Y = 6 | 743 | 494 | 1237 |
| | | | | X = 5, Y = 0 | 76 | 1 | 77 |
| | | | | X = 5, Y = 1 | 23 | 1 | 24 |
| | | | | X = 5, Y = 2 | 2 | 4 | 6 |
| | | | | X = 5, Y = 3 | | 2 | 2 |
| | | | | X = 5, Y = 4 | 164 | 69 | 233 |
| | | | | X = 6, Y = 0 | 1016 | 64 | 1080 |
| | | | | X = 6, Y = 1 | 78 | 20 | 98 |
| | | | | X = 6, Y = 2 | 212 | 532 | 744 |
| | | | | X = 6, Y = 3 | 159 | 273 | 432 |
| | | | | X = 6, Y = 4 | 105 | 327 | 432 |
| | | | | X = 6, Y = 5 | 204 | 173 | 377 |
| | | | | X = 6, Y = 6 | 420 | 353 | 773 |

TABLE 7.2

Summary characteristics of the majority class
nodes across various Kohonen net grid sizes

| Grid Size | No. of points in nodes where the majority class is dominant | Percentage of total majority class points in those nodes | No. of minority class points in those nodes | Percentage of total minority class points in those nodes |
|---|---|---|---|---|
| 5 × 5 | 3418 | 27.5% | 65 | 1.7% |
| 7 × 7 | 5847 | 47.0% | 228 | 6.0% |
| 25 × 25 | 8591 | 69.0% | 210 | 5.5% |

The basic objective of this embodiment of the invention is to get good separation of the classes in the first layer Kohonen net and then use an ensemble of Kohonen sub-models (or an ensemble of hypersphere nets) in a second layer to further separate the classes at nodes where the minority class has a significant presence. And, in this process, it can explore many different grid sizes in the first layer (e.g. 5×5, 7×7, 25×25) and ensemble them to get better performance.

In essence, the algorithm uses Kohonen nets as a tool to break up class regions into smaller sub-regions to provide better visibility to the different class regions. It is somewhat similar to decision tree methods. However, one of the powerful features of Kohonen nets is that it breaks up (that is, it groups) data points considering all of the features, unlike decision tree methods that only consider a subset of features to build trees.

7.4 Second Layer of Kohonen Net Ensembles to Find Minority Class Regions

According to this embodiment of the invention, the algorithm trains another set of Kohonen nets (a second layer of Kohonen subnets) for the data subsets at each of the nodes in the first Kohonen net where the minority class has a significant presence. For example, the 5×5 grid Kohonen net in Table 7.1 above has 13 nodes with a significant minority class presence. Those 13 nodes contain 3781 out of the total 3846 minority class points (i.e. 98% of the minority points), but also have 9017 majority class points. Thus, the algorithm breaks up the regions corresponding to these nodes to gain better visibility to both the majority and minority class subregions. The algorithm does this by creating an ensemble of Kohonen subnets for the data points at each of these nodes that has a significant presence of the minority class. For example, the node X=0, Y=0 in the 5×5 grid Kohonen net of Table 7.1 has 1044 points of the majority class (<=50K) and 980 points of the minority class (>50K). These data points at the node X=0, Y=0 are then used to build an ensemble of Kohonen subnets of different sizes to gain further visibility into the subregions of each class.

The algorithm treats the almost homogeneous nodes, where any class is dominant, as leaf or terminal nodes in the sense of a decision tree, according to an embodiment. Only the non-homogeneous nodes are split up using Kohonen subnets, again in the sense of decision trees. The two-layered Kohonen nets are structurally somewhat similar to one-layer decision stumps. In this embodiment, the algorithm uses an ensemble of Kohonen subnets mainly to prevent overfitting because many of these nodes may not contain a large number of data points.

7.5 Algorithm to Handle Imbalanced Data Problems, According to an Embodiment The algorithms described above in sections 3.5 and 4.4 are revised, according to the following embodiments, to handle imbalanced data problems, in an embodiment of the invention. Table 7.1 shows the additional notations used.

TABLE 7.1

Summary of additional notations
used for imbalanced data problems

| Symbol | Meaning |
|---|---|
| FGSL | Number of Kohonen subnets of different grid sizes in a second layer Kohonen ensemble in a particular feature space |
| $CPCT_k$ | Percentage of data points in the streaming data that belongs to class k, k = 1 . . . kc |
| $IMPCT_{max}$ | Maximum percentage of data points that can belong to a class for a class to be a minority class (e.g. maximum 25%) |
| MCL | the set of classes considered minority class |
| CCM | the total percentage of all minority class counts at an active node |
| $MCLNODE_{FP_q}$ | the list of active nodes in first layer Kohonen nets for feature subset $FP_q$, q = 1 . . . FS, where the minority class has a significant presence |
| $MCLNODE\text{-}FSB_{kj}$ | the list of active nodes in first layer Kohonen nets for each feature subset $FSB_{kj}$, k = 1 . . . kc, j = 1 . . . $B_{max}$, where the minority class has a significant presence |

7.5.1 Algorithm for Class-Specific Feature Selection from Streaming Data for Imbalanced Problems Step 1. Process some streaming data to find the approximate maximum and minimum values of each feature. Use the range to normalize streaming input patterns during subsequent processing. The input vector x is assumed to be normalized in this algorithm. (Note: Other methods of data normalization can be also be used in this algorithm.).

Track and compute $CMPCT_k$, the approximate percentage of data points in the streaming data that belong to class k, k=1 . . . kc, when finding the maximum and minimum values for each feature. If $CMPCT_k < IMPCT_{max}$, then class k is a minority class. Add class k to the minority class list MCL.

Step 2. Randomly partition the N features into FS subsets (FS=$KN_{max}$/FG) where each partition is denoted by $FP_q$, q=1 . . . FS. If the problem is imbalanced (i.e. MCL, the set of minority classes, is nonempty), then reduce FS (e.g. FS=0.5 $KN_{max}$/FG) and leave some resources aside to build a second layer Kohonen subnets.

Step 3. Initialize the weights and learning parameters of the $KN_{max}$ Kohonen nets (or a reduced set of Kohonen nets if the problem is imbalanced data) that will be trained in parallel, where FG is the number of Kohonen nets of different grid sizes for each feature partition $FP_q$, q=1 . . . FS.

Step 4. Train all $KN_{max}$ Kohonen nets in parallel (or a reduced set of Kohonen nets if the problem is imbalanced data) using streaming data and selecting appropriate parts of the input pattern vector for each Kohonen net according to the feature subset assigned to it. Stop training when all the Kohonen nets converge and their $CWR_T$ ratios are at or below $CWR_T^{Min}$.

Step 5. Process some more streaming data through the stabilized Kohonen nets, without changing the weights, to find the active nodes (winning neurons) and their class counts. Stop when class count percentages at all active nodes converge and are stable.

Step 6. Assign each active node (neuron) to a class if the class count percentage CC for the most active class at that node is $>=PCT_{min}$. If the problem is not imbalanced data, discard all active neurons that do not satisfy the $PCT_{min}$ requirement or have a low total class count. If the problem is not imbalanced data, go to Step 7.

If the problem is imbalanced data, compute CCM at each active node by adding all minority class counts and computing its percentage of total class counts at that node. If CCM >$IMPCT_{max}$, add that active node to the set $MCLNODE_{FP_q}$, the list of active nodes in first layer Kohonen nets for each feature subset $FP_q$, q=1 . . . FS, where the minority class has a significant presence. A node assigned to the list $MCLNODE_{FP_q}$ is not assigned to any class.

Now train the second layer ensemble of Kohonen subnets corresponding to each first layer node in the list $MCLNODE_{FP_q}$ where the minority class has a significant presence.

Step A. Initialize the weights and learning parameters of FGSL second layer Kohonen subnets for each first layer node in the list $MCLNODE_{FP_q}$, $FP_q$, q=1 . . . FS. FGSL is the number of Kohonen subnets of different grid sizes for each feature partition.

Step B. Process some additional streaming data to train all second layer Kohonen subnets in parallel and by selecting appropriate parts of the input pattern for each Kohonen subnet according to the feature partition $FP_q$, q=1 . . . FS. Stop training when all Kohonen subnets converge; that is, when $CWR_T<=CWR_T^{Min}$ for all Kohonen nets. For this step, each such second layer ensemble is trained with just the streaming data points that are assigned to the corresponding first layer node of a first layer Kohonen net.

Step C. Process some additional streaming data through the stabilized second layer Kohonen subnets, without changing the weights, to get class counts for the active nodes in all of the second layer Kohonen subnets. Stop when class percentages become stable for all second layer Kohonen subnets.

Step D. Assign each active node (neuron) in the second layer Kohonen nets to a class if the class count percentage CC for the most active class at that node is $>=PCT_{min}$. Discard all active neurons that do not satisfy the $PCT_{min}$ requirement.

Step 7. Create a list of the remaining active nodes by class for each feature partition $FP_q$, q=1 . . . FS.

Step 8. Compute the separability indices of the features separately for each feature partition $FP_q$, q=1 . . . FS. Compute the separability indices of the particular features in a feature partition using the remaining active neurons for that feature partition only. Those remaining active neurons, which have been assigned to classes, are representative examples of the classes.

Step 9. Repeat steps 2 through 8 a few times and track the maximum separability index value of each feature.

Step 10. Rank features on the basis of their maximum separability index value.

7.5.2 Algorithm to Train the Final Set of Kohonen Nets for Classification for Imbalanced Data Problems If the problem is imbalanced data (i.e., MCL, the set of minority classes, is nonempty), then reduce $B_{max}$ (e.g. $B_{max}$=0.5 $KN_{max}$/(FG*(kc+1))) and leave some resources aside to build second layer Kohonen subnets.

Step 1. Initialize bucket number j to zero.

Step 2. Increment bucket number j (j=j+1) and add (Inc*j) number of top ranked features to bucket $FB_j$ from the ranked feature list of each class k (k=1 . . . kc). $FSB_{kj}$ is the set of (Inc*j) top ranked features of class k in bucket j.

Step 3. Initialize final Kohonen nets, in parallel in a distributed computing system, of FG different grid sizes for each class k (k=1 . . . kc) and for the corresponding feature set $FSB_{kj}$. Also initialize FG Kohonen nets for a feature set that includes all of the features from all classes in bucket j. If j<$B_{max}$, go back to step 2 to set up other Kohonen nets for other feature buckets. When j=$B_{max}$, go to step 4.

Step 4. Train all $KN_{max}$ Kohonen nets in parallel using streaming data and selecting appropriate parts of the input pattern for each Kohonen net according to the feature subsets $FSB_{kj}$, k=1 . . . kc, j=1 . . . $B_{max}$. Stop training when all Kohonen nets converge; that is, when $CWR_T<=CWR_T^{Min}$ for all Kohonen nets.

Step 5. Process some more streaming data through the stabilized Kohonen nets, without changing the weights, to find the set $AN_{kj}$ of active nodes (neurons) in the corresponding Kohonen nets for each class k in each bucket j (k=1 . . . kc, j=1 . . . $B_{max}$). Also find the set of active nodes for the Kohonen net that uses all features of all classes in bucket j, j=1 . . . $B_{max}$. In addition, get the class counts $CTA_{kji}$ of the active nodes and stop when the class count percentages $CTP_{kjim}$, m=1 . . . kc, become stable for all active nodes.

Step 6. Assign each active node $AN_{kji}$ to the majority class m if the class count percentage $CTP_{kjim}$, m=1 . . . kc, for the majority class m at that active node is above the minimum threshold $PCT_{min}$ and the absolute class count $CTA_{kji}$ is above the threshold $CT_{min}$. If the problem is not imbalanced data, go to Step 7.

If the problem is imbalanced data, compute CCM at each active node $AN_{kji}$ by adding all minority class counts and computing its percentage of total class counts at that node. If CCM >$IMPCT_{max}$, add that active node to the set MCLNODE-$FSB_{kj}$, the list of active nodes in first layer Kohonen nets for each feature subset $FSB_{kj}$, k=1 . . . kc, j=1 . . . $B_{max}$, where the minority class has a significant presence. A node assigned to the list MCLNODE-$FSB_{kj}$ is not assigned to any class.

Now train the second layer ensemble of Kohonen subnets corresponding to each first layer node in the list MCLNODE-$FSB_{kj}$ where the minority class has a significant presence.

Step A. Initialize the weights and learning parameters of FGSL second layer Kohonen subnets for each first layer node in the list MCLNODE-$FSB_{kj}$, $FSB_{kj}$, k=1 . . . kc, j=1 . . . $B_{max}$. FGSL is the number of Kohonen subnets of different grid sizes for each feature partition.

Step B. Process some additional streaming data to train all second layer Kohonen subnets in parallel and by selecting appropriate parts of the input pattern for each Kohonen subnet according to the feature partition $FSB_{kj}$, k=1 . . . kc, j=1 . . . $B_{max}$. Stop training when all Kohonen subnets converge; that is, when $CWR_T<=CWR_T^{Min}$ for all Kohonen nets.

For this step, each such second layer ensemble is trained with just the streaming data points that are assigned to the corresponding first layer node of a first layer Kohonen net.

Step C. Process some additional streaming data through the stabilized second layer Kohonen subnets, without changing the weights, to get class counts for the active nodes in all of the second layer Kohonen subnets. Stop when class percentages become stable for all second layer Kohonen subnets.

Step D. Assign each active node (neuron) in the second layer Kohonen subnets to a class if the class count percentage CC for the most active class at that node is $>=PCT_{min}$. Add these second layer active nodes to $AN_{kj}$, the list of active nodes for class k and feature set $FSB_{kj}$. Discard all active neurons which do not satisfy the $PCT_{min}$ requirement.

Step 7. Process some more streaming data to compute the radius $W_{kji}$ of each active node $AN_{kji}$. Stop when the radii or widths become stable.

Step 8. Retain only the active nodes $AN_{kj}$, k=1 . . . kc, j=1 . . . $B_{max}$, from the corresponding Kohonen nets (or subnets) that satisfy the minimum thresholds $PCT_{min}$ and $CT_{min}$. Also retain the active nodes from the Kohonen nets (or subnets) based on all features of all classes in bucket j, j=1 . . . $B_{max}$, and who satisfy the minimum thresholds. Discard all other nodes from all of the Kohonen nets.

This algorithm produces a set of active Kohonen neurons for each bucket j, j=1 . . . $B_{max}$, and each Kohonen neuron is assigned to a specific class, according to embodiments of the invention.

7.6 Computational Results for Imbalanced Data Problems of which 4000 examples correspond to the "no" class and 521 examples correspond to the "yes" class. Thus the "yes" class has only about 11.52% of the data points and was considered a minority class.

It ought to be mentioned that many experts suggest not using accuracy as the evaluation measure on imbalanced data problems. To them, for imbalanced data problems, correct prediction of the minority class is of main concern. Thus, a slightly higher overall error rate is often tolerated. The tables below show both the overall accuracy and the number of minority class points correctly classified.

The performance of this algorithm was compared to three variations of decision tree algorithms available in IBM's SPSS Modeler—C&R Tree, CHAID and Quest—since decision tree algorithms are conceptually similar to this algorithm. For the decision tree algorithms, the parameters were set to their default values.

Table 7.3 shows the results for the adult census data and Table 7.4 shows the results for the bank marketing data. In both cases, the Kohonen Ensemble method described herein found more of the minority class data points in both the training and test sets than the other methods, while accuracy decreased only slightly.

TABLE 7.3

Training and test accuracies and the number of minority class points correctly classified by the four algorithms for the adult census dataset (Kohavi 1996)

| | Kohonen Ensemble | | C&R Tree | | CHAID | | Quest | |
|---|---|---|---|---|---|---|---|---|
| | No. of Minority Class points correctly classified | Accuracy | No. of Minority Class points correctly classified | Accuracy | No. of Minority Class points correctly classified | Accuracy | No. of Minority Class points correctly classified | Accuracy |
| TRAIN | 2516 | 84.71% | 1918 | 84.9% | 2046 | 83.56% | 1473 | 81.46% |
| TEST | 4730 | 81.93% | 3919 | 84.7% | 4091 | 82.86% | 2962 | 81.04% |

TABLE 7.4

Training and test accuracies and the number of minority class points correctly classified by the four algorithms for the bank marketing dataset (Moro et al. 2014)

| | Kohonen Ensemble | | C&R Tree | | CHAID | | Quest | |
|---|---|---|---|---|---|---|---|---|
| | No. of Minority Class points correctly classified | Accuracy | No. of Minority Class points correctly classified | Accuracy | No. of Minority Class points correctly classified | Accuracy | No. of Minority Class points correctly classified | Accuracy |
| TRAIN | 181 | 90.00% | 76 | 89.29% | 141 | 89.07% | 125 | 89.96% |
| TEST | 1312 | 87.6% | 873 | 89.11% | 1244 | 88.83% | 1136 | 89.5% |

Some computational results on imbalanced data problems follow. Computational testing used two widely referenced datasets—the adult census data of Kohavi (1996) and the bank marketing data of Moro et al. (2014). The bank marketing dataset is from a Portuguese banking institution and was used in their direct marketing campaign to sell term deposits to their customers. The dataset has general information about customers and details of phone contacts made with them. The task is to predict whether a term deposit will be subscribed to or not by the customer based on a phone call. Those who subscribe are classified as "yes" and those who don't as "no." It has 4521 examples in the training set

8. HARDWARE IMPLEMENTATION OF EMBODIMENTS TO EXPLOIT PARALLEL COMPUTATIONS

Figure 6:
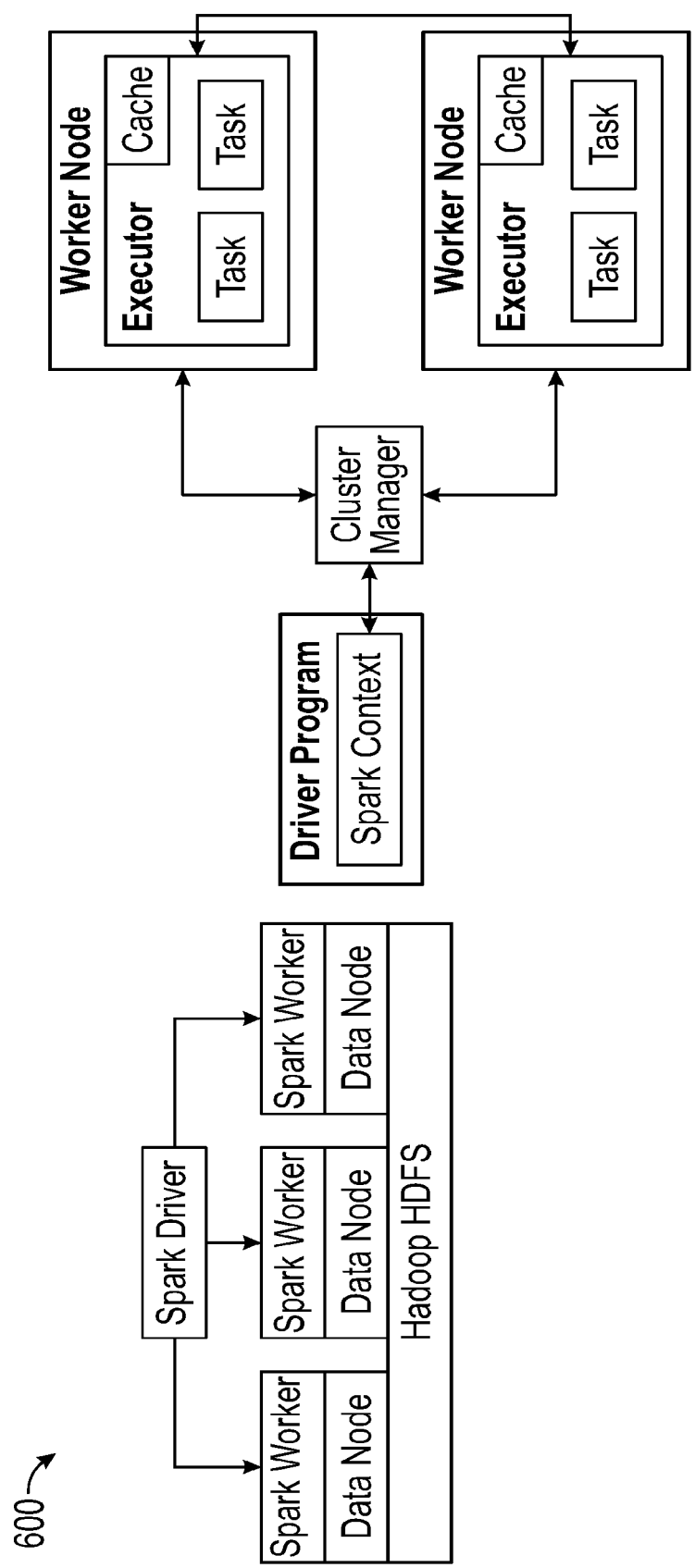
FIG. 6 illustrates embodiments of the invention may be implemented on a distributed computing platform.

Embodiments of the invention may be implemented both on a distributed computing platform 600, such as Apache Spark, as depicted in FIG. 6, and on neural hardware. A neural hardware implementation can exploit massively parallel computations at the neuronal level of a Kohonen net. Such an implementation can be useful in many domains that require fast learning and response, including IoT (Internet of Things) and robotics. Such an implementation can also process stored data in a very fast manner Designs of Kohonen chips—both analog and digital versions—are currently available and such chips can be produced in large quantities.

8.1 Localized Learning to Save Signal Transmission Cost in IOT; Facilitate Distributed Control and Decision-Making A hardware implementation of embodiments of the invention allow for localization of learning and response. The advantage of localized learning and response is that it will reduce the volume of signal transmission through expensive networks such as the Internet. For example, if a piece of critical machinery is being continuously monitored with localized hardware for performance and potential failure, no continuous signal transmission through large networks to a cloud-based agent need to occur until certain thresholds are reached that indicate performance deterioration or impending failure. Thus, localized hardware can reduce unnecessary transmissions through large networks in a significant way. Hardware-based localized learning and monitoring cannot only reduce the volume of network traffic and its cost, it will also reduce (or even eliminate) the dependence on a single control center, such as the cloud, for decision-making and control. Localized learning and monitoring will allow for distributed decision-making and control of machinery and equipment in IoT.

A hardware implementation of embodiments of the invention will also make learning machines widely deployable on an "anytime, anywhere" basis even when there is no access to a network and/or a cloud facility.

9. CONCLUSION

Embodiments of the invention provide a method for large scale machine learning. The method can learn from both stored and streaming data; of course, stored data has to be streamed to this method. It is, therefore, a general purpose machine learning method for classification problems. And, as shown by the experimental results, the method in particular is very powerful at reducing the dimensions of high-dimensional problems and its accuracy is also very competitive. Online methods are also highly scalable because they do not need simultaneous access to the training data and can learn by examining a single record at a time. Another advantage of online methods is that they can learn from all of the data and need not sample from the data.

If machine learning systems are to be widely deployed and used in big data, IoT and other environments, a certain level of automation of learning is needed. Automation can reduce the dependence on highly skilled machine learning experts to develop applications. Without a certain level of automation, the cost of deploying machine learning applications can become prohibitive, thereby inhibiting their wider use and diminishing the economic benefits of big data and IoT. Embodiments of the invention provide a step towards automation of learning. Such automation can be achieved through an ensemble of classifiers and by less stringent requirements for parameter setting.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method for analyzing patterns in a volume of data and taking an action based on the analysis, comprising:
   receiving the volume of data;
   training in parallel a first plurality of Artificial Neural Networks (ANNs) of different sizes, each of the first plurality of ANNs a self-organizing map, using the data, to create a plurality of new representative data points that are representative of different classes of patterns in the data and are represented by nodes in the first plurality of ANNs;

ranking a plurality of features using the plurality of new representative data points that are representative of different classes of patterns in the data, for each of the different classes of patterns in the data;

selecting, using the ranked plurality of features, a plurality of features that are predictive of different classes of patterns in the data;

training in parallel a second plurality of ANNs of different sizes, and in different feature spaces comprising different combinations of the ranked and selected plurality of features, each of the second plurality of ANNs a self-organizing map, using the data;

extracting only active nodes that are representative of a class of patterns in the data from the second plurality of ANNs and adding class labels to each extracted active node;

determining a combination of features that are predictive of different classes of patterns in the data;

retaining the extracted class-labeled active nodes corresponding to the combination of features that are predictive of different classes of patterns in the data;

classifying patterns in the data based on the retained class-labeled active nodes; and taking an action based on the classified patterns in the data.

2. The method of claim 1, wherein receiving the volume of data comprises receiving streaming data ("a data stream").

3. The method of claim 1, further comprising discarding the first plurality of ANNs prior to training in parallel the second plurality of ANNs.

4. The method of claim 1, wherein selecting, using the ranked plurality of features, the plurality of features that are predictive of different classes of patterns in the data, using the representative data points, reduces dimensionality of the data.

5. The method of claim 1, wherein selecting, the ranked plurality of features, the plurality of features that are predictive of different classes of patterns in the data, using the representative data points, produces a separation between patterns in different classes and also makes the patterns within each class more compact.

6. A method for classifying data having a plurality of features belonging to a plurality of classes of patterns in streaming data, comprising:

receiving the streaming data;

training in parallel a first plurality of Artificial Neural Networks (ANNs), of different grid sizes, and each of which is a self-organizing map, by processing the streaming data, wherein the first plurality of ANNs form clusters, wherein active nodes in the first plurality of ANNs are the centers of the clusters and serve as representative examples of different classes in the streaming data;

assigning the active nodes in the first plurality of ANNs to one of the plurality of classes;

ranking a plurality of features for each of the plurality of classes;

grouping one or more of the plurality of features into each of a plurality of separate categories based on the ranking;

training in parallel a second plurality of ANNs, of different grid sizes and in different feature spaces comprising different combinations of the grouped and ranked plurality of features, and each of which is a self-organizing map, by processing the streaming data;

assigning active nodes in the second plurality of ANNs to one of the plurality of classes; and creating a group of hypersphere-based classifiers from a subset of the active nodes in the second plurality of ANNs.

7. The method of claim 6, wherein assigning the active nodes in the first plurality of ANNs to one of the plurality of classes is based on a number of times each of the active nodes in the first plurality of ANNs is activated by data points belonging to each of the plurality of classes.

8. The method of claim 6, wherein assigning the active nodes in the second plurality of ANNs to one of the plurality of classes is based on a number of times each of the active nodes in the second plurality of ANNs is activated by data points belonging to each of the plurality of classes.

9. The method of claim 6, wherein ranking the plurality of features for each of the plurality of classes is based on separability indices for each feature.

10. The method of claim 9, further comprising computing the separability indices for each feature in the plurality of features and for each class in the plurality of classes prior to ranking the plurality of features for each of the plurality of classes based on the separability indices for each feature.

11. The method of claim 6, wherein:

receiving the streaming data comprises receiving streaming data that is unbalanced; and the active nodes in the first plurality of ANNs that are the centers of the clusters that serve as representative examples of different classes in the streaming data serve as representative examples of majority classes and minority classes in the streaming data; and the method further comprising:

training in parallel a third plurality of ANNs, of different grid sizes and for a plurality of different subsets of the plurality of features, by processing the streaming data, wherein active nodes in the third plurality of ANNs serve as representative examples of majority classes and minority classes in the streaming data when a minimum threshold is exceeded in the of active nodes in the third plurality of ANNs.

12. The method of claim 11, wherein the representative examples of majority classes and minority classes in the streaming data are created for each class of patterns in the received streaming data and are represented by active nodes in the first plurality of ANNs.

13. A non-transitory computer-readable medium containing computer-executable instructions that, when executed by a processor, cause the processor to analyze patterns in a volume of data and take an action based on the analysis, according to a method comprising:

receiving the volume of data;

training in parallel a first plurality of Artificial Neural Networks (ANNs) of different sizes, each of the first plurality of ANNs a self-organizing map, using the data, to create a plurality of new representative data points that are representative of different classes of patterns in the data and are represented by nodes in the first plurality of ANNs;

ranking a plurality of features using the plurality of new representative data points that are representative of different classes of patterns in the data, for each of the different classes of patterns in the data;

selecting, using the ranked plurality of features, a plurality of features that are predictive of different classes of patterns in the data;

training in parallel a second plurality of ANNs of different sizes, and in different feature spaces comprising different combinations of the ranked and selected plurality of features, each of the second plurality of ANNs a self-organizing map, using the data;

extracting only active nodes that are representative of a class of patterns in the data from the second plurality of ANNs and adding class labels to each extracted active node;

determining a combination of features that are predictive of different classes of patterns in the data;

retaining the extracted class-labeled active nodes corresponding to the combination of features that are predictive of different classes of patterns in the data;

classifying patterns in the data based on the retained class-labeled active nodes; and taking an action based on the classified patterns in the data.

14. The non-transitory computer-readable medium of claim 13, further comprising discarding the first plurality of ANNs prior to training in parallel the second plurality of ANNs.

15. The non-transitory computer-readable medium of claim 13 wherein selecting, using the ranked plurality of features, the plurality of features that are predictive of different classes of patterns in the data, using the representative data points, reduces dimensionality of the data.

16. The non-transitory computer-readable medium of claim 13 wherein selecting, using the ranked plurality of features, the plurality of features that are predictive of different classes of patterns in the data, using the representative data points, produces a separation between patterns in different classes and also makes the patterns within each class more compact.

* * * * *